United States Patent
Holland et al.

(10) Patent No.: US 10,906,258 B2
(45) Date of Patent: *Feb. 2, 2021

(54) CAST-MOLDING PROCESS FOR PRODUCING CONTACT LENSES

(71) Applicant: Alcon Inc., Fribourg (CH)

(72) Inventors: Troy Vernon Holland, Suwanee, GA (US); Frank Chang, Cumming, GA (US); Ryan DeSousa, Atlanta, GA (US)

(73) Assignee: Alcon Inc., Fribourg (CH)

( * ) Notice: Subject to any disclaimer, the term of this patent is extended or adjusted under 35 U.S.C. 154(b) by 70 days.

This patent is subject to a terminal disclaimer.

(21) Appl. No.: 16/114,528

(22) Filed: Aug. 28, 2018

(65) Prior Publication Data

US 2019/0061293 A1 Feb. 28, 2019

Related U.S. Application Data

(60) Provisional application No. 62/551,333, filed on Aug. 29, 2017.

(51) Int. Cl.
| | | |
|---|---|---|
| B29D 11/00 | (2006.01) | |
| C08F 16/06 | (2006.01) | |
| G02B 1/04 | (2006.01) | |
| B29K 105/24 | (2006.01) | |
| B29K 105/00 | (2006.01) | |
| B29K 29/00 | (2006.01) | |

(52) U.S. Cl.
CPC .. B29D 11/00134 (2013.01); B29D 11/00048 (2013.01); C08F 16/06 (2013.01); G02B 1/043 (2013.01); B29K 2029/04 (2013.01); B29K 2105/0002 (2013.01); B29K 2105/24 (2013.01)

(58) Field of Classification Search
CPC ......... B29D 11/00134; B29D 11/00048; C08F 16/06; G02B 1/043
See application file for complete search history.

(56) References Cited

U.S. PATENT DOCUMENTS

| | | |
|---|---|---|
| 4,136,250 A | 1/1979 | Mueller et al. |
| 4,153,641 A | 5/1979 | Deichert et al. |
| 4,182,822 A | 1/1980 | Chang |
| 4,189,546 A | 2/1980 | Deichert et al. |
| 4,254,248 A | 3/1981 | Friends et al. |
| 4,259,467 A | 3/1981 | Keogh et al. |
| 4,260,725 A | 4/1981 | Keogh et al. |
| 4,261,875 A | 4/1981 | Leboeuf |
| 4,276,402 A | 6/1981 | Chromecek et al. |
| 4,327,203 A | 4/1982 | Deichert et al. |
| 4,341,889 A | 7/1982 | Deichert et al. |
| 4,343,927 A | 8/1982 | Chang |
| 4,355,147 A | 10/1982 | Deichert et al. |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany et al. |
| 4,605,712 A | 8/1986 | Mueller et al. |
| 4,661,575 A | 4/1987 | Tom |
| 4,684,538 A | 8/1987 | Klemarczyk |
| 4,703,097 A | 10/1987 | Wingler et al. |
| 4,833,218 A | 5/1989 | Lee |
| 4,837,289 A | 6/1989 | Mueller et al. |
| 4,954,586 A | 9/1990 | Toyoshima et al. |
| 4,954,587 A | 9/1990 | Mueller |
| 5,010,141 A | 4/1991 | Mueller |
| 5,034,461 A | 7/1991 | Lai et al. |
| 5,039,761 A | 8/1991 | Ono et al. |
| 5,070,170 A | 12/1991 | Robertson et al. |
| 5,079,319 A | 1/1992 | Mueller |
| 5,346,946 A | 9/1994 | Yokoyama et al. |
| 5,358,995 A | 10/1994 | Lai et al. |
| 5,387,632 A | 2/1995 | Lai et al. |
| 5,416,132 A | 5/1995 | Yokoyama et al. |
| 5,449,729 A | 9/1995 | Lai |
| 5,451,617 A | 9/1995 | Lai et al. |
| 5,486,579 A | 1/1996 | Lai et al. |
| 5,508,317 A | 4/1996 | Mueller |
| 5,583,163 A | 12/1996 | Mueller |
| 5,665,840 A | 9/1997 | Pohlmann et al. |
| 5,712,356 A | 1/1998 | Bothe et al. |
| 5,760,100 A | 6/1998 | Nicolson et al. |
| 5,789,464 A | 8/1998 | Muller |
| 5,843,346 A | 12/1998 | Morrill |
| 5,849,810 A | 12/1998 | Muller |
| 5,849,841 A | 12/1998 | Muhlebach et al. |
| 5,894,002 A | 4/1999 | Boneberger et al. |
| 5,962,548 A | 10/1999 | Vanderlaan et al. |
| 5,981,675 A | 11/1999 | Valint, Jr. et al. |

(Continued)

FOREIGN PATENT DOCUMENTS

WO 02/071106 A1 9/2002

OTHER PUBLICATIONS

Tetsuro Majima, Wolfram Schnabel and Wilhelm Weber; Phenyl-2,4,6-trimethylbenzoylphosphinates as water-soluble photoinitiators. Generation and reactivity of O=P(C6H5)(O-) radical anions; Makromol. Chem.; 192, (1991), pp. 2307-2315.

Jacqueline H. Degroot et al., Hydrophilic Polymeric Acylphospine Oxide Photoinitiators/Crosslinkers for in Vivo Blue-Light Photopolymerization; Biomacromolecules, 2001, vol. 2, No. 4, pp. 1271-1278.

Hang Lin et al., Application of visible light-based projection stereolithography for live cell-scaffold fabrication with designed architecture; Biomaterials 34 (2013) pp. 331-339.

Benjamin D. Fairbanks et al., Photoinitiated polymerization of PEG-diacrylate with lithium phenyl-2,4,6-trimethylbenzoylphosphinate: polymerization rate and cytocompatibility; Biomaterials 30 (2009) pp. 6702-6707.

A. Priola, F. Renzi, and S. Cesca; Structure-Property Relationships for Radiaion Curable Coatings; Journal of Coatings Technology; vol. 55, No. 703 (Aug. 1983) pp. 63-73.

(Continued)

*Primary Examiner* — Mathieu D Vargot
(74) *Attorney, Agent, or Firm* — Jian Zhou

(57) ABSTRACT

Described herein is a cast-molding process for producing contact lenses in a relatively short curing time. The short curing time has been achieved by adding a chain transfer agent into a lens-forming composition.

7 Claims, No Drawings

(56) References Cited

U.S. PATENT DOCUMENTS

| | | |
|---|---|---|
| 6,039,913 A | 3/2000 | Hirt et al. |
| 6,165,408 A | 12/2000 | Steinmann |
| 6,221,303 B1 | 4/2001 | Steinmann |
| 6,242,149 B1 * | 6/2001 | Maeda .................. G03F 7/027 428/402.2 |
| 6,303,687 B1 | 10/2001 | Muller |
| 6,472,489 B1 | 10/2002 | Stockinger |
| 6,479,587 B1 | 11/2002 | Stockinger et al. |
| 6,492,478 B1 | 12/2002 | Steinmann |
| 6,627,124 B1 | 9/2003 | Herbrechtsmeier et al. |
| 6,762,264 B2 | 7/2004 | Kunzler et al. |
| 6,800,225 B1 | 10/2004 | Hagmann et al. |
| 6,867,245 B2 | 3/2005 | Iwata et al. |
| 6,995,192 B2 | 2/2006 | Phelan et al. |
| 7,091,283 B2 | 8/2006 | Muller et al. |
| 7,214,809 B2 | 5/2007 | Zanini et al. |
| 7,238,750 B2 | 7/2007 | Muller et al. |
| 7,268,189 B2 | 9/2007 | Muller et al. |
| 7,384,590 B2 | 6/2008 | Kelly et al. |
| 7,387,759 B2 | 6/2008 | Kelly et al. |
| 7,423,074 B2 | 9/2008 | Lai et al. |
| 7,521,519 B1 | 4/2009 | Hirt et al. |
| 7,605,190 B2 | 10/2009 | Moszner et al. |
| 7,915,323 B2 | 3/2011 | Awashti et al. |
| 7,977,430 B2 | 7/2011 | Devlin et al. |
| 8,003,710 B2 | 8/2011 | Medina et al. |
| 8,071,658 B2 | 12/2011 | Zhou et al. |
| 8,071,703 B2 | 12/2011 | Zhou et al. |
| 8,088,313 B2 | 1/2012 | Hagmann et al. |
| 8,383,744 B2 | 2/2013 | Justynska et al. |
| 8,404,783 B2 | 3/2013 | Chang et al. |
| 8,415,405 B2 | 4/2013 | Maggio et al. |
| 8,420,711 B2 | 4/2013 | Awashti et al. |
| 8,475,529 B2 | 7/2013 | Clarke |
| 8,524,800 B2 | 9/2013 | Phelan |
| 8,529,057 B2 | 9/2013 | Qiu et al. |
| 8,557,940 B2 | 10/2013 | Chang et al. |
| 8,614,261 B2 | 12/2013 | Iwata et al. |
| 8,642,712 B2 | 2/2014 | Chang et al. |
| 8,658,748 B2 | 2/2014 | Liu et al. |
| 8,993,651 B2 | 3/2015 | Chang et al. |
| 9,097,840 B2 | 8/2015 | Chang et al. |
| 9,103,965 B2 | 8/2015 | Chang |
| 9,151,873 B2 | 10/2015 | Chang et al. |
| 9,187,601 B2 * | 11/2015 | Huang .................. C08G 77/42 |
| 9,217,813 B2 | 12/2015 | Liu et al. |
| 9,475,827 B2 | 10/2016 | Chang et al. |
| 2010/0008843 A1 | 1/2010 | Hauge et al. |
| 2012/0088844 A1 | 4/2012 | Kuyu et al. |
| 2012/0244088 A1 | 9/2012 | Saxena et al. |
| 2012/0245249 A1 | 9/2012 | Saxena et al. |
| 2014/0171543 A1 | 6/2014 | Chang et al. |
| 2017/0002029 A1 | 1/2017 | Chang et al. |
| 2017/0158611 A1 | 6/2017 | Chang et al. |
| 2017/0166673 A1 | 6/2017 | Huang et al. |
| 2017/0242275 A1 | 8/2017 | Chang et al. |
| 2018/0100038 A1 | 4/2018 | Jing et al. |
| 2018/0100053 A1 | 4/2018 | Jing et al. |
| 2018/0105620 A1 | 4/2018 | Chang et al. |

OTHER PUBLICATIONS

Robin A. Hutchinson; Modeling of Free-Radical Polymerization Kinetics with Crosslinking for Methyl Methacrylate/Ethylene Glycol Dimethacrylate; Polymer Reaction Engineering; 1(4), pp. 521-577 (1992-93).

John Spevacek, PhD.; Significant Acceleration of a UV-Cured Coating; 2010 ANETC Conference; May 18, 2010; Aspen Research Corporation, pp. 1-6.

Wadida Oraby and William K. Walsh; Elastomeric Electron Beam-Cured Coatings: Structure-Property Relationships. II. Chain Transfer Agents; Journal of Applied Polymer Science, vol. 23, (1979) pp. 3243-3254.

Giampaolo Giuliani and Aldo Priola; Dynamic thermomechanometry of networks from acrylated epoxy resins; Polymer, vol. 23, (1982), pp. 761-765.

* cited by examiner

CAST-MOLDING PROCESS FOR PRODUCING CONTACT LENSES

This application claims the benefit under 35 USC § 119 (e) of U.S. provisional application No. 62/551,333 filed 29 Aug. 2017, incorporated by reference in its entirety.

This invention is related to a cast-molding process for producing contact lenses contact lenses in a relatively short curing time. In addition, the present invention is related to contact lenses produced according to the process of the invention.

BACKGROUND

Most commercially-available hydrogel contact lenses are produced according to a conventional cast molding technique involving use of disposable plastic molds and a mixture of vinylic monomers and crosslinking agents. There are several disadvantages with the conventional cast-molding technique. For example, a traditional cast-molding manufacturing process often includes lens extraction in which unpolymerized monomers must be removed from the lenses by using an organic solvent. Use of organic solvents can be costly and is not environmentally friendly. In addition, disposable plastic molds inherently have unavoidable dimensional variations, because, during injection-molding of plastic molds, fluctuations in the dimensions of molds can occur as a result of fluctuations in the production process (temperatures, pressures, material properties), and also because the resultant molds may undergo non-uniformly shrinking after the injection molding. These dimensional changes in the mold may lead to fluctuations in the parameters of contact lenses to be produced (peak refractive index, diameter, basic curve, central thickness etc.) and to a low fidelity in duplicating complex lens design.

The above described disadvantages encountered in a conventional cast-molding technique can be overcome by using the so-called Lightstream Technology™ (CIBA Vision), which involves (1) a lens-forming composition being substantially free of monomers and comprising a substantially-purified, water-soluble prepolymer with ethylenically-unsaturated groups, (2) reusable molds produced in high precision, and (3) curing under a spatial limitation of actinic radiation (e.g., UV), as described in U.S. Pat. Nos. 5,508,317, 5,583,163, 5,789,464, 5,849,810, 6,800,225, and 8,088,313. Lenses produced according to the Lightstream Technology™ can have high consistency and high fidelity to the original lens design, because of use of reusable, high precision molds. In addition, contact lenses with high quality can be produced at relatively lower cost due to the short curing time, a high production yield, and free of lens extraction and in an environmentally friendly manner because of use of water as solvent for preparing lens formulations.

However, the Lightstream Technology™ has not been applied to make UV-absorbing contact lenses, largely because of the lack of water-soluble photoinitiator which can efficiently initiate curing (polymerization) of an aqueous lens formulation using a visible light having a wavelength from 380 to 460 nm. Examples of known efficient visible-light photoinitiators include 2,4,6-trimethylbenzoyldiphenylphosphine oxide (TPO), 2,4,6-trimethylbenzoylethoxyphenylphosphine oxide (TPO-L), and bis(2,4,6-trimethylbenzoyl)phenylphosphine oxide (BAPO), acylgermanium compounds described in U.S. Pat. No. 7,605,190 (herein incorporated by reference in its entirety). But, those available photoinitiators are insoluble in water and cannot be used in the production of contact lenses from an aqueous lens formulation according to the Lightstream Technology™. Some attempts have been made to prepare more hydrophilic phosphine oxide photoinitiators (Majima, Tetsuro; Schnabel, W.; Weber, W. *Makromolekulare Chemie* 1991, 192(10), 2307-15; De Groot, J. H.; et. al. *Biomacromolecules* 2001, 2, 1271). The phosphine oxide photoinitiators reported in those studies either have a limited solubility in water or have a much reduced efficiency in initiating polymerization (i.e., prolonging the cure times).

Therefore, there are still needs for a process for producing contact lenses using a visible light having a wavelength from 380 to 460 nm according to the Lightstream Technology™.

SUMMARY

In one aspect, the invention provides a process for producing contact lenses. A process of the invention comprises the steps of: obtaining a lens-forming composition comprising at least one lens-forming material, at least one photoinitiator, and at least one thiol-containing compound or polymer in an amount for reducing the curing time of the lens-forming composition by at least 20% compared to a control lens-forming composition; introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity for receiving the lens-forming composition is formed between said first and second molding surfaces; and irradiating, with a UV or visible light, the lens-forming composition in the mold for a time period of about 15 seconds or less, so as to crosslink and/or polymerize said at least one lens-forming material to form the contact lens.

The invention provides in another aspect contact lenses obtained according to a method of the invention.

DETAILED DESCRIPTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

A "contact Lens" refers to a structure that can be placed on or within a wearer's eye. A contact lens can correct, improve, or alter a user's eyesight, but that need not be the case.

As used in this application, the term "hydrogel" or "hydrogel material" refers to a crosslinked polymeric material which is insoluble in water, but can hold at least 10 percent by weight of water in its three-dimensional polymer networks (i.e., polymer matrix) when it is fully hydrated.

A "vinylic monomer" refers to a compound that has one sole ethylenically-unsaturated group and is soluble in a solvent.

The term "soluble", in reference to a compound or material in a solvent, means that the compound or material can be dissolved in the solvent to give a solution with a concentration of at least about 0.1% by weight at room temperature (i.e., from about 20° C. to about 30° C.).

The term "insoluble", in reference to a compound or material in a solvent, means that the compound or material can be dissolved in the solvent to give a solution with a concentration of less than 0.005% by weight at room temperature (as defined above).

The term "ethylenically unsaturated group" is employed herein in a broad sense and is intended to encompass any groups containing at least one >C=C<group. Exemplary ethylenically unsaturated groups include without limitation (meth)acryloyl

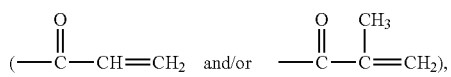

allyl, vinyl (—CH=CH$_2$), 1-methylethenyl

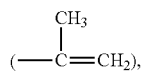

styrenyl, or the likes.

The term "(meth)acryloylamido group" refers to a radical of

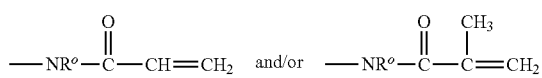

in which $R^o$ is hydrogen or a $C_1$-$C_6$ alkyl.

The term "(meth)acrylamide" refers to methacrylamide and/or acrylamide.

The term "(meth)acrylate" refers to methacrylate and/or acrylate.

The term "acrylic monomer" refers to a vinylic monomer having one sole (meth)acryloyl group.

An "N-vinyl amide monomer" refers to an amide compound having a vinyl group —CH=CH$_2$) that is directly attached to the nitrogen atom of the amide group.

A "methylene-containing (=CH$_2$) pyrrolidone monomer" refers to a 5-member lactam compound having one 5-membered nitrogen heterocycle and one methylene group that is directly attached to one of the carbon atoms of the 5-membered nitrogen heterocycle.

A "hydrophilic vinylic monomer", as used herein, refers to a vinylic monomer which can be polymerized to form a homopolymer that is water-soluble or can absorb at least 10 percent by weight of water.

A "hydrophobic vinylic monomer" refers to a vinylic monomer which can be polymerized to form a homopolymer that is insoluble in water and can absorb less than 10 percent by weight of water.

A "prepolymer" refers to a starting polymer which contains two or more ethylenically unsaturated groups and can be cured (e.g., crosslinked) actinically to obtain a crosslinked polymer having a molecular weight much higher than the starting polymer.

As used in this application, the term "vinylic crosslinker" refers to a compound having at least two ethylenically unsaturated groups. A "vinylic crosslinking agent" refers to a vinylic crosslinker having a molecular weight of about 700 Daltons or less.

As used in this application, the term "a lens-forming material" refers to an actinically-polymerizable and/or actinically-crosslinkable material. Examples of lens-forming materials include without limitation vinylic monomer, vinylic crosslinkers, prepolymers, and combinations thereof.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionizing radiation (e.g. gamma ray or X-ray irradiation), microwave irradiation, and the like. Thermal curing or actinic curing methods are well-known to a person skilled in the art.

As used in this application, the term "polymer" means a material formed by polymerizing/crosslinking one or more monomers or macromers or prepolymers.

As used in this application, the term "molecular weight" of a polymeric material (including monomeric or macromeric materials) refers to the number-average molecular weight unless otherwise specifically noted or unless testing conditions indicate otherwise.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. A alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxyl (—OH), carboxyl (—COOH), —NH$_2$, thiol (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

A "photoinitiator" refers to a chemical that initiates free radical crosslinking/polymerizing reaction by the use of light.

In this application, a "UV-absorbing vinylic monomer" refers to a vinylic monomer comprising an ethylenically-unsaturated group and an UV-absorbing moiety (benzophenone or benzotriazole moiety) which can absorb or screen out UV radiation in the range from 200 nm to 400 nm as understood by a person skilled in the art.

A "spatial limitation of actinic radiation" refers to an act or process in which energy radiation in the form of rays is directed by, for example, a mask or screen or combinations thereof, to impinge, in a spatially restricted manner, onto an area having a well-defined peripheral boundary. A spatial limitation of UV/visible radiation is obtained by using a mask or screen having a radiation (e.g., UV and/or visible light) permeable region, a radiation (e.g., UV and/or visible light) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV radiation and/or visible radiation) having a cross-sectional profile defined by the projection contour of the mask or screen. The projected beam of radiation (e.g., UV radiation and/or visible radiation) limits radiation impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV and/or visible beam (i.e., a spatial limitation of radiation). The radiation used for the crosslinking is radiation energy, especially UV radiation (and/or visible radiation), gamma radiation, electron radiation or thermal radiation, the radiation energy preferably being in the form of a substantially parallel beam in order on the one hand to achieve good restriction and on the other hand efficient use of the energy.

As used in this application, the term "curing time" in reference to a lens-forming composition means a time period required for crosslinking and/or polymerizing the lens-forming composition to form a crosslinked material which is insoluble in isopropanol.

The term "modulus" or "elastic modulus" in reference to a contact lens or a material means the tensile modulus or Young's modulus which is a measure of the stiffness of a contact lens or a material. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

"UVA" refers to radiation occurring at wavelengths between 315 and 380 nanometers; "UVB" refers to radiation occurring between 280 and 315 nanometers; "Violet" refers to radiation occurring at wavelengths between 380 and 440 nanometers.

"UVA transmittance" (or "UVA % T") and "UVB transmittance" or "UVB % T" are calculated by the following formula $$UVA \% T = \frac{\text{Average \% Transmission between 315 nm and 380 nm}}{\text{Luminescence \% } T} \times 100$$

$$UVB \% T = \frac{\text{Average \% Transmission between 280 nm and 315 nm}}{\text{Luminescence \% } T} \times 100$$

in which Luminescence % T is determined by the following formula $$\text{Luminescence \% T=Average \% Transmission between 780-380 nm.}$$

In general, the invention is directed to a fast curing process for producing contact lenses. This invention is partly based on the unexpected discovery that by adding a chain-transfer agent (i.e., a thiol-containing compound) into a lens-forming composition having a visible-light photoinitiator, the curing time of that composition with a visible light can be significantly reduced, compared to a "control composition" (the only difference between the lens-forming composition and the control composition is that the control composition is free of any chain-transfer agent whereas the lens-forming composition contains at a chain-transfer agent). By reducing the curing time of a lens-forming composition with a visible light, UV-absorbing contact lenses can be produced by using a visible light having a wavelength from 380 to 460 nm (i.e., outside of UV radiation) according to the Lightstream Technology™. It is believed that a relatively longer curing time may adversely affect the quality of lens edge of contact lenses made according to the Lightstream Technology™ and can increase the product cost by lowering the production output. Although one might be able to shorten the curing time of a monomer mixture by increasing the curing light intensity and/or the concentration of a photoinitiator in the monomer mixture, the high curing light intensity and high photoinitiator concentration have limits and may not be sufficient to reduce the curing time enough for the Lightstream Technology™. Further, these measures may cause resultant lenses with undesirable physical properties, such as, for example, fragile and high content of extractable due to unpolymerized monomers due to inhomogeneous curing.

It is also discovered that the addition of a chain-transfer agent into a lens-forming composition can reduce the elastic modulus of resultant crosslinked materials (e.g., contact lenses). Low elastic modulus means that resultant contact lenses are softer and would be generally more comfortable for wearing.

In one aspect, the invention provides a process for producing contact lenses. A process of the invention comprises the steps of: obtaining a lens-forming composition comprising at least one lens-forming material, at least one photoinitiator, and at least one thiol-containing compound or polymer in an amount for reducing the curing time of the lens-forming composition (preferably by at least 20%, more preferably at least 30%, even more preferably at least 40%, most preferably at least 50% compared to a control composition); introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity for receiving the lens-forming composition is formed between said first and second molding surfaces; and irradiating, with a UV or visible light, the lens-forming composition in the mold for a time period of about 15 seconds or less (preferably about 12.5 seconds or less, more preferably about 10 seconds or less, even more preferably from about 3 to about 9 seconds), so as to crosslink and/or polymerize said at least one lens-forming material to form the contact lens.

In this application, a "control composition" refers to a polymerizable composition which is free of any thiol-containing compound or polymer and can be served as a base polymerizable composition for preparing a lens-forming composition by adding a desired amount of at least one thiol-containing compound or polymer into the control composition.

In accordance with the invention, the reduction in curing time ($\Delta T_{curing}$) is calculated by the following equation $$\Delta T_{curing}\% = \frac{T^o_{curing} - T^t_{curing}}{T^o_{curing}} \times 100\%$$

in which $T^o_{curing}$ is the curing time for the control composition and $T^t_{curing}$ is the curing time of the lens-forming composition including a thiol-containing compound or polymer. It is understood that the curing time is obtained by photo-rheology study using the same light source at the same light intensity, as illustrated in Example 1.

In a preferred embodiment, the photoinitiator is a visible-light photoinitiator which can initiate free radical crosslinking and/or polymerizing reaction upon irradiation with a visible light having a wavelength greater than 380 nm (preferably greater than 380 and less than 500 nm) and the step of irradiating is performed by using said visible light.

In accordance with the invention, the lens-forming material comprises preferably at least one vinylic macromer or at least one prepolymer, more preferably comprises at least one prepolymer.

Any visible light photoinitiators can be used in the invention. Examples of preferred visible light photoinitiators include without limitation water-soluble acylphosphinate salts. One example of water-soluble acylphosphinate salts is Lithium phenyl (2,4,6-trimethylbenzoyl) phosphinate, available from Tokyo Chemical Industry Co., Ltd.

In accordance with the invention, any thiol-containing compounds or thiol-containing polymers can be used in the invention, so long as they contain at least one thiol group (—SH).

Examples of preferred thiol-containing compounds and thiol-containing polymers include without limitation 2-mercaptoethylamine, 2-mercaptopropylamine, 3-mercaptopropylamine, 2-mercaptobutylamine, 3-mercaptobutylamine, 4-mercaptobutylamine, 5-mercaptopentylamine, 6-mercaptohexylamine, 1-amino-2-methyl-2-propanethiol hydrochloride, N-methylaminoethanethiol, N-ethylaminoethanethiol, N-methylaminopropanethiol, N-ethylaminopropanethiol, N-methylaminobutanethiol, N-ethylaminobutanethiol, 2-(butylamino)ethanethiol, thioglycolic acid, ammonium thioglycolate, thiolactic acid, mercaptosuccinic acid, meso-2,3-dimercaptosuccinic acid, 2-mercaptoisobutyric acid, 2-methyl-3-sulfanylpropanoic acid, 4-mercaptobutyric acid, 6-mercaptohexanoic acid, 8-mercaptooctanoic acid, 2-mercaptoethanol, 1-mercapto-2-propanol, 2,3-dimercapto-1-propanol, 1-thioglycerol, 3-mercapto-1-propanol, 4-mercapto-1-butanol, 3-mercapto-1-hexanol, 4-mercapto-4-methylpentan-2-ol, 6-mercapto-1-hexanol, 8-mercapto-1-octanol, 9-mercapto-1-nonanol, 2-mercapto-pyrimidine-4,6-diol; cysteine; 4-amino-5-mercapto-pentanoic acid, 2-mercapto-4-amino-6-hydroxypyrimidine, 2-mercaptosuccinic acid, 3-mercapto-2-(methylamino)propanoic acid, 2-mercapto-4,5-dihydro-1h-imidazole-4,5-diol, 3-mercaptotyramine, mercaptopropanediol, 2-mercaptomethyiglutaric acid, 3-mercapto-DL-valine hydrochloride, 2,2,2-trifluoroethanethiol, ethanethiol, 1,2-ethanedithiol, methyl thioglycolate, 2-methoxyethanethiol, 2-propanethiol, 1,3-propanedithiol, N-acetylcysteamine, 2-mercaptoethyl ether, 1-butanethiol, 2-methyl-1-propanethiol, 2-methyl-2-propanethiol, 1,4-butanedithiol, 2,2'-thiodiethanethiol, 4-cyano-1-butanethiol, 3-sulfanyl-2-pentanone, cyclopentanethiol, 2-(2-methoxyethoxy)ethanethiol, 2-methyl-1-butanethiol, 3-methyl-1-butanethiol, 1,5-pentanedithiol, 4-methyl-4-mercaptopentan-2-one, 3-mercapto-3-methyl-1-butyl-1-formate, 3-mercaptobutyl acetate, cyclohexanethiol, 1,6-hexanedithiol, 2-ethylhexanethiol, 1-nonanethiol, trimethylolpropane tris(3-mercaptopropionate), a poly(ethylene glycol) having one sole terminal thiol group, a poly(ethylene glycol) having two terminal thiol groups, a multi-arm poly(ethylene glycol) having one terminal thiol group at each arm (4-arm PEG having four terminal thiol groups, 8-arm PEG having 8 terminal thiol groups, etc.), a polyvinyl alcohol having pendant thiol groups disclosed in U.S. Pat. Appl. Ser. No. 62/409,948 (herein incorporated by reference in its entirety), and combinations thereof.

Preferably, the lens-forming composition comprises from about 0.1% to about 1% by weight of at least one thiol-containing compound and thiol-containing polymer.

In accordance with the invention, any lens-forming materials can be used in the invention. Examples of known lens-forming materials include without limitation hydrophilic vinylic monomers, hydrophobic vinylic monomers, vinylic crosslinkers, UV-absorbing vinylic monomers, prepolymers, and combinations thereof.

Any hydrophilic vinylic monomers can be used in the invention. Examples of preferred hydrophilic vinylic monomers are alkyl (meth)acrylamides (as described below), hydroxy-containing acrylic monomers (as described below), amino-containing acrylic monomers (as described below), carboxyl-containing acrylic monomers (as described below), N-vinyl amide monomers (as described below), methylene-containing pyrrolidone monomers (i.e., pyrrolidone derivatives each having a methylene group connected to the pyrrolidone ring at 3- or 5-position) (as described below), acrylic monomers having a $C_1$-$C_4$ alkoxyethoxy group (as described below), vinyl ether monomers (as described below), allyl ether monomers (as described below), phosphorylcholine-containing vinylic monomers (as described below), N-2-hydroxyethyl vinyl carbamate, N-carboxyvinyl-β-alanine (VINAL), N-carboxyvinyl-α-alanine, and combinations thereof.

Examples of alkyl (meth)acrylamides includes without limitation (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

Examples of hydroxy-containing acrylic monomers include without limitation N-2-hydroxyethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol) ethyl (meth)acrylamide having a number average molecular weight of up to 1500, and combinations thereof.

Examples of amino-containing acrylic monomers include without limitation N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)

acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof.

Examples of carboxyl-containing acrylic monomers include without limitation 2-(meth)acrylamidoglycolic acid, (meth)acrylic acid, ethylacrylic acid, and combinations thereof.

Examples of preferred N-vinyl amide monomers include without limitation N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

Examples of preferred methylene-containing ($=CH_2$) pyrrolidone monomers include without limitations 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

Examples of preferred acrylic monomers having a $C_1$-$C_4$ alkoxyethoxy group include without limitation ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, and combinations thereof.

Examples of preferred vinyl ether monomers include without limitation ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

Examples of preferred allyl ether monomers include without limitation allyl alcohol, ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof.

Examples of preferred phosphorylcholine-containing vinylic monomers inlcude without limitation (meth)acryloyloxyethyl phosphorylcholine (aka, MPC, or 2-((meth)acryloyloxy)ethyl-2'-(trimethylammonio)ethylphosphate), (meth)acryloyloxypropyl phosphorylcholine (aka, 3-((meth)acryloyloxy)propyl-2'-(trimethylammonio)ethylphosphate), 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof.

In accordance with the invention, any hydrophobic vinylic monomers can be in this invention. Hydrophobic vinylic monomers can be silicone-containing vinylc monomers, non-silicone hydrophobic vinylic monomers, or combinations thereof.

Examples of preferred non-silicone hydrophobic vinylic monomers include methyl (meth)acrylate, ethyl (meth)acrylate, propyl (meth)acrylate, isopropyl (meth)acrylate, cyclohexyl (meth)acrylate, 2-ethylhexyl (meth)acrylate, vinyl acetate, vinyl propionate, vinyl butyrate, vinyl valerate, styrene, chloroprene, vinyl chloride, vinylidene chloride, (meth)acrylonitrile, 1-butene, butadiene, vinyl toluene, vinyl ethyl ether, perfluorohexylethyl-thio-carbonyl-aminoethyl-methacrylate, isobornyl (meth)acrylate, trifluoroethyl (meth)acrylate, hexafluoro-isopropyl (meth)acrylate, hexafluorobutyl (meth)acrylate, and combinations thereof.

In accordance with the invention, a silicone-containing vinylic monomer can be any silicone-containing vinylic monomer known to a person skilled in the art. Examples of preferred silicone-containing vinylic monomers include without limitation vinylic monomers each having a bis(trialkylsilyloxy)alkylsilyl group or a tris(trialkylsilyloxy)silyl group, polysiloxane vinylic monomers, polycarbosiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

Examples of preferred silicone-containing vinylic monomers each having a bis(trialkylsilyloxy)alkylsilyl group or a tris(trialkylsilyloxy)silyl group include without limitation tris(trimethylsilyloxy)-silylpropyl (meth)acrylate, [3-(meth)acryloxy-2-hydroxypropyloxy]propylbis(trimethylsiloxy)-methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy) methylsilane, 3-(meth)acryloxy-2-hydroxypropyloxy) propyltris(trimethylsiloxy)silane, N-[tris(trimethylsiloxy)-silylpropyl]-(meth)acrylamide, N-(2-hydroxy-3-(3-(bis(trimethylsilyloxy)methylsilyl)propyloxy)-propyl)-2-methyl (meth)acrylamide, N-(2-hydroxy-3-(3-(bis(trimethylsilyloxy)methylsilyl)-propyloxy)propyl) (meth)acrylamide, N-(2-hydroxy-3-(3-(tris(trimethylsilyloxy)silyl) propyloxy)-propyl)-2-methyl acrylamide, N-(2-hydroxy-3-(3-(tris(trimethylsilyloxy)silyl)propyloxy)propyl) (meth)acrylamide, N-[tris(dimethylpropylsiloxy)silylpropyl]-(meth)acrylamide, N-[tris(dimethylphenylsiloxy) silylpropyl] (meth)acrylamide, N-[tris(dimethylethylsiloxy) silylpropyl] (meth)acrylamide, N,N-bis[2-hydroxy-3-(3-(bis(trimethylsilyloxy)methylsilyl)propyloxy)propyl]-2-methyl (meth)acrylamide, N,N-bis[2-hydroxy-3-(3-(bis(trimethylsilyloxy)methylsilyl)propyloxy)-propyl] (meth)acrylamide, N,N-bis[2-hydroxy-3-(3-(tris(trimethylsilyloxy)silyl)propyloxy)propyl]-2-methyl (meth)acrylamide, N,N-bis[2-hydroxy-3-(3-(tris(trimethylsilyloxy)silyl)propyloxy)propyl] (meth)acrylamide, N-[2-hydroxy-3-(3-(t-butyldimethylsilyl)propyloxy)propyl]-2-methyl (meth)acrylamide, N-[2-hydroxy-3-(3-(t-butyldimethylsilyl)propyloxy)propyl] (meth)acrylamide, N,N-bis[2-hydroxy-3-(3-(t-butyldimethylsilyl)propyloxy)propyl]-2-methyl (meth)acrylamide, N-2-(meth)acryloxyethyl-O-(methyl-bis-trimethylsiloxy-3-propyl)silyl carbamate, 3-(trimethylsilyl) propylvinyl carbonate, 3-(vinyloxycarbonylthio)propyl-tris(trimethyl-siloxy)silane, 3-[tris(trimethylsiloxy)silyl] propylvinyl carbamate, 3-[tris(trimethylsiloxy)silyl] propyl allyl carbamate, 3-[tris(trimethylsiloxy)silyl]propyl vinyl carbonate, those disclosed in U.S. Pat. Nos. 9,097,840, 9,103,965 and 9,475,827 (herein incorporated by references in their entireties), and mixtures thereof. The above preferred silicone-containing vinylic monomers can be obtained from commercial suppliers or can be prepared according to procedures described in U.S. Pat. Nos. 7,214,809, 8,475,529, 8,658,748, 9,097,840, 9,103,965, and 9,475,827 (herein incorporated in reference in their entireties).

Examples of preferred polysiloxane vinylic monomers include without limitation mono-(meth)acryloyl-terminated, monoalkyl-terminated polysiloxanes of formula (I) include without limitation α-(meth)acryloxypropyl terminated ω-butyl (or ω-methyl) terminated polydimethylsiloxane, α-(meth)acryloxy-2-hydroxypropyloxypropyl terminated ω-butyl (or ω-methyl) terminated polydimethylsiloxane, α-(2-hydroxy-methacryloxypropyloxypropyl)-ω-butyl-decamethylpentasiloxane, α-[3-(meth)acryloxyethoxy-2-hydroxypropyloxypropyl]-terminated ω-butyl (or ω-methyl) terminated polydimethylsiloxane, α-[3-(meth)acryloxy-propyloxy-2-hydroxypropyloxypropyl]-terminated ω-butyl (or ω-methyl) terminated polydimethylsiloxane, α-[3-(meth)acryloxyisopropyloxy-2-hydroxypropyloxypropyl]-terminated ω-butyl (or ω-methyl) terminated polydimethylsiloxane, α-[3-(meth)acryloxybutyloxy-2-hydroxypropyloxypropyl]-terminated ω-butyl (or ω-methyl) terminated polydimethylsiloxane, α-[3-(meth)acryloxyethylamino-2-hydroxypropyloxypropyl]-terminated ω-butyl (or ω-methyl) terminated polydimethylsiloxane, α-[3-(meth)acryloxypropylamino-2-hydroxypropyloxypropyl]-terminated ω-butyl (or ω-methyl) terminated polydimethylsiloxane, α-[3-(meth)acryloxybutylamino-2-hydroxypropyloxypropyl]-terminated ω-butyl (or ω-methyl) terminated polydimethylsiloxane, α-(meth)acryloxy(polyethylenoxy)-2-hydroxypropyloxypropyl]-terminated w-butyl (or ω-methyl) terminated polydimethylsiloxane, α-[(meth)acryloxy-2-hydroxypropyloxyethoxypropyl]-terminated ω-butyl (or ω-methyl) terminated polydimethylsiloxane, α-[(meth)acryloxy-2-hydroxypropyl-N-ethylaminopropyl]-terminated ω-butyl (or ω-methyl) terminated polydimethylsiloxane, α-[(meth)acryloxy-2-hydroxypropyl-aminopropyl]-terminated w-butyl (or ω-methyl) terminated polydimethylsiloxane, α-[(meth)acryloxy-2-hydroxypropyloxy-(polyethylenoxy)propyl]-terminated ω-butyl (or ω-methyl) terminated polydimethylsiloxane, α-(meth)acryloylamidopropyloxypropyl terminated ω-butyl (or ω-methyl) terminated polydimethylsiloxane, α-N-methyl-(meth)acryloylamidopropyloxypropyl terminated ω-butyl (or w-methyl) terminated polydimethylsiloxane, α-[3-(meth)acrylamidoethoxy-2-hydroxypropyloxy-propyl]-terminated ω-butyl (or ω-methyl) polydimethylsiloxane, α-[3-(meth)acrylamidopropyloxy-2-hydroxypropyloxypropyl]-terminated ω-butyl (or ω-methyl) terminated polydimethylsiloxane, α-[3-(meth)acrylamido-isopropyloxy-2-hydroxypropyloxypropyl]-terminated ω-butyl (or ω-methyl) terminated polydimethylsiloxane, α-[3-(meth)acrylamidobutyloxy-2-hydroxypropyloxypropyl]-terminated ω-butyl (or ω-methyl) terminated polydimethylsiloxane, α-[3-(meth)acryloylamido-2-hydroxypropyloxypropyl] terminated ω-butyl (or ω-methyl) polydimethylsiloxane, α-[3-[N-methyl-(meth)acryloylamido]-2-hydroxypropyloxypropyl] terminated ω-butyl (or ω-methyl) terminated polydimethylsiloxane, N-methyl-N'-(propyltetra(dimethylsiloxy)dimethylbutyisilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy)dimethylbutylsilane, mono-vinyl carbonate-terminated mono-alkyl-terminated polydimethylsiloxanes, mono-vinyl carbamate-terminated mono-alkyl-terminated polydimethylsiloxane, those disclosed in U.S. Pat. Nos. 9,097,840 and 9,103,965 (herein incorporated by references in their entireties), and mixtures thereof. The above preferred polysiloxanes vinylic monomers can be obtained from commercial suppliers (e.g., Shin-Etsu, Gelest, etc.) or prepared according to procedures described in patents, e.g., U.S. Pat. Appl. Pub. Nos. 6867245, 8415405, 8475529, 8614261, and 9217813 (herein incorporated in references in their entireties), or by reacting a hydroxyalkyl (meth)acrylate or (meth)acrylamide or a (meth)acryloxypolyethylene glycol with a mono-epoxypropyloxypropyl-terminated polydimethylsiloxane, by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane, or by reacting isocyanatoethyl (meth)acrylate with a mono-carbinol-terminated polydimethylsiloxane according to coupling reactions well known to a person skilled in the art.

Any polycarbosiloxane vinylic monomers can be used in the invention. Examples of preferred polycarbosiloxane vinylic monomers include without limitation those disclosed in U.S. Pat. Nos. 7,915,323 and 8,420,711 and in U.S. Pat. Appl. Pub. Nos. 2012/244088A1 and 2012/245249A1 (herein incorporated by references in their entireties).

In accordance with the invention, a vinylic crosslinker can be any silicone-containing vinylic crosslinkers, non-silicone vinylic crosslinkers, or combinations thereof.

Any suitable silicone-containing vinylic crosslinkers can be used in the invention. Examples of preferred silicone-containing vinylic crosslinkers include without limitation polysiloxane vinylic crosslinkers, polycarbosiloxane vinylic crosslinkers, and combinations thereof.

Any suitable polysiloxane vinylic crosslinkers can be used in the invention. Examples of preferred polysiloxane vinylic crosslinkers are di-(meth)acryloyl-terminated polydimethylsiloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100 (herein incorporated by reference in its entirety); polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264 (here incorporated by reference in their entireties); polysiloxane-containing macromers disclosed in U.S. Pat. Nos. 4,259,467, 4,260,725, and 4,261,875 (herein incorporated by reference in their entireties).

Examples of preferred di-(meth)acryloyloxy-terminated polysiloxane vinylic crosslinkers includes without limitation the reaction products of glycidyl methacrylate with di-amino-terminated polydimethylsiloxanes; the reaction products of glycidyl methacrylate with di-hydroxy-terminated polydimethylsiloxanes; the reaction products of isocyantoethyl (meth)acrylate with di-hydroxy-terminated polydimethylsiloxanes; di-(meth)acryloyloxy-terminated polysiloxane vinylic crosslinkers each having hydrophilized siloxane units each having one methyl substituent and one monovalent $C_4$-$C_{40}$ organic radical substituent having 2 to 6 hydroxyl groups as disclosed in U.S. patent application Ser. No. 15/376,700 (herein incorporated by reference in its entirety); chain-extended polysiloxabe vinylic crosslinkers disclosed in US201008843A1 and US20120088844A1 (herein incorporated by references in their entireties); chain-extended polysiloxane vinylic crosslinkers described in U.S. Pat. Nos. 5,034,461, 5,416,132, 5,449,729, 5,760,100, 7,423,074, and 8,529,057 (herein incorporated by reference in their entireties); chain-extended polysiloxane vinylic crosslinkers described in U.S. Pat. App. Ser. No. 62/406,465 (herein incorporated by reference in its entirety); chain-extended polysiloxane vinylic crosslinkers described in U.S. Pat. App. Ser. No. 62/406,467 (herein incorporated by reference in its entirety); chain-extended polysiloxane vinylic crosslinkers described in U.S. Pat. No. 8,993,651 (herein incorporated by reference in its entirety); α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxy-propyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxy-butylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane.

Any polycarbosiloxane vinylic crosslinkers can be used in the invention. Examples of preferred polycarbosiloxane vinylic crosslinkers include without limitation those disclosed in U.S. Pat. Nos. 7,915,323 and 8,420,711 and in U.S. Pat. Appl. Pub. Nos. 2012/244088 and 2012/245249 (herein incorporated by references in their entireties).

In accordance with the invention, any non-silicone vinylic crosslinkers can be in this invention. Examples of preferred non-silicone vinylic cross-linking agents include without limitation ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate; piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, and combinations thereof. A preferred non-silicone vinylic cross-linking agent is tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, and combinations thereof.

In accordance with the invention, prepolymers can be water-soluble prepolymers free of silicone, silicone-containing prepolymers with hydrophilic segments and hydrophobic segments, or combinations thereof.

Examples of water-soluble prepolymers include without limitation: a water-soluble crosslinkable poly(vinyl alcohol) prepolymer described in U.S. Pat. Nos. 5,583,163 and 6,303,687; a water-soluble vinyl group-terminated polyurethane prepolymer described in U.S. Pat. No. 6,995,192; prepolymers which are derivatives of a polyvinyl alcohol, polyethyleneimine or polyvinylamine, which are disclosed in U.S. Pat. No. 5,849,841; a water-soluble crosslinkable polyurea prepolymer described in U.S. Pat. Nos. 6,479,587 and 7,977,430; crosslinkable polyacrylamide prepolymer; crosslinkable statistical copolymer prepolymers of vinyl lactam, MMA and a comonomer, which are disclosed in U.S. Pat. No. 5,712,356; crosslinkable copolymer prepolymers of vinyl lactam, vinyl acetate and vinyl alcohol, which are disclosed in U.S. Pat. No. 5,665,840; polyether-polyester copolymer prepolymers with crosslinkable side chains which are disclosed in U.S. Pat. No. 6,492,478; branched polyalkylene glycol-urethane prepolymers disclosed in U.S. Pat. No. 6,165,408; polyalkylene glycol-tetra(meth)acrylate prepolymers disclosed in U.S. Pat. No. 6,221,303; crosslinkable polyallylamine gluconolactone prepolymers disclosed in U.S. Pat. No. 6,472,489; water-soluble and UV-absorbing polyvinyl alcohol prepolymers disclosed in U.S. Pat. Appl. Pub. No. 2017-0158611A1; all of which are incorporated herein by references in their entireties.

Any suitable of silicone-containing prepolymers with hydrophilic segments and hydrophobic segments can be used in the invention. Examples of such silicone-containing prepolymers include those described in commonly-owned U.S. Pat. Nos. 6,039,913, 7,091,283, 7,268,189, 7,238,750, 7,521,519, 8,003,710, 8,071,658, 8,071,703, 8,383,744, 8,404,783, 8,524,800, 8,557,940, 8,642,712, 9,187,601, and 9,151,873 (all of which are incorporated herein by references in their entireties).

A lens-forming composition can further comprise visibility tinting agents (e.g., pigments, reactive dyes, polymerizable dyes, or mixtures thereof), antimicrobial agents (e.g., silver nanoparticles), a bioactive agent (e.g., a drug, an amino acid, a polypeptide, a protein, a nucleic acid, 2-pyrrolidone-5-carboxylic acid (PCA), an alpha hydroxy acid, linoleic and gamma linoleic acids, vitamins, or any combination thereof), leachable lubricants (e.g., a non-crosslinkable hydrophilic polymer having an average molecular weight from 5,000 to 500,000, preferably from 10,000 to 300,000, more preferably from 20,000 to 100,000 Daltons), leachable tear-stabilizing agents (e.g., a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof), and the like, as known to a person skilled in the art.

In a preferred embodiment, the lens-forming composition is a water-based lens-forming composition which comprises one or more water-soluble actinically-crosslinkable prepolymers, preferably one or more water-soluble actinically-crosslinkable poly(vinyl alcohol) prepolymers. Preferably, a water-soluble, actinically-crosslinkable polyvinyl alcohol prepolymer comprises repeating units of vinyl alcohol (i.e., 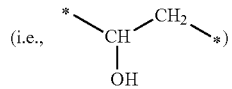)

and repeating units of formula (I)

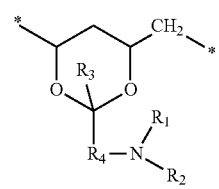

in which:

R$_1$ is hydrogen or C$_1$-C$_6$ alkyl (preferably hydrogen or C$_1$-C$_4$ alkyl, more preferably hydrogen or methyl or ethyl, even more preferably hydrogen or methyl);

R$_2$ is an ethylenically unsaturated group of

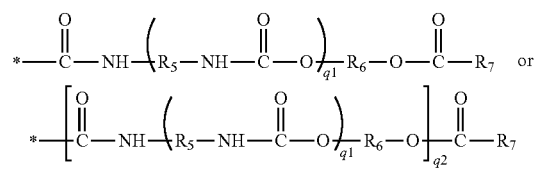

in which q1 and q2 independently of each another are zero or one, and R$_5$ and R$_6$ independently of each another are a C$_2$-C$_8$ alkylene divalent radical, R$_7$ is C$_2$-C$_8$ alkenyl;

R$_3$ can be hydrogen or a C$_1$-C$_6$ alkyl group (preferably hydrogen); and

R$_4$ is a C$_1$-C$_6$ alkylene divalent radical (preferably a C$_1$-C$_4$ alkylene divalent radical, more preferably methylene or butylene divalent radical, even more preferably methylene divalent radical).

More preferably, a water-soluble, actinically-crosslinkable polyvinyl alcohol prepolymer further comprises UV-absorbing repeating units, each of which preferably is a repeating unit of formula (II)

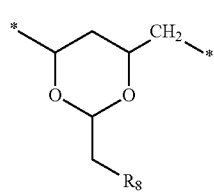

R$_8$ is a monovalent radical of any one of formula (III)-(VII)

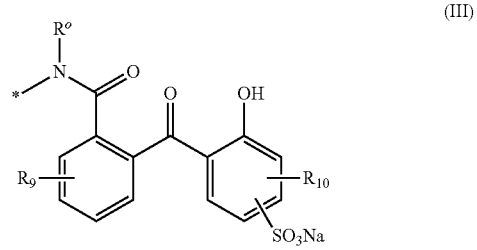

-continued

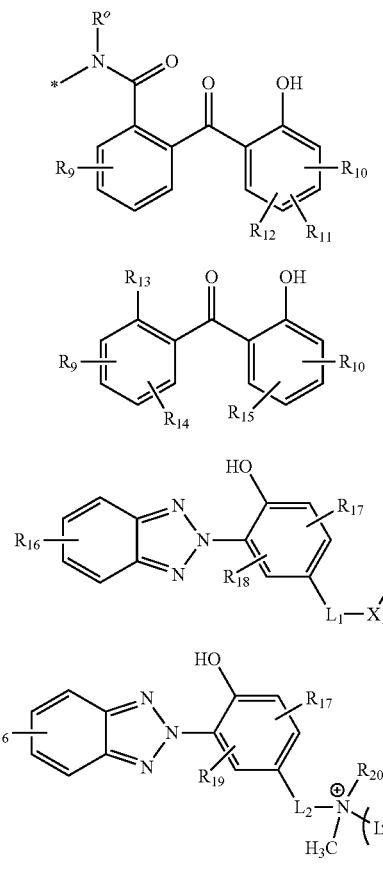

in which:
q1 is zero or 1-4;
$R^o$ is H, $CH_3$ or $C_2H_5$;
$R_9$, $R_{10}$ and $R_{17}$ independent of one other are H, $CH_3$, $CCl_3$, $CF_3$, Cl, Br, NR'R" in which
R' and R" independent of each other are H or $C_1$-$C_4$ alkyl, OH, or $OCH_3$;
$R_{11}$ and $R_{12}$ independent of each other are H or a first hydrophilic group which is *—$CH_2$—$(OC_2H_4)_{n1}$—$OCH_3$, *—$CH_2$—$(OC_2H_4)_{n1}$—OH,

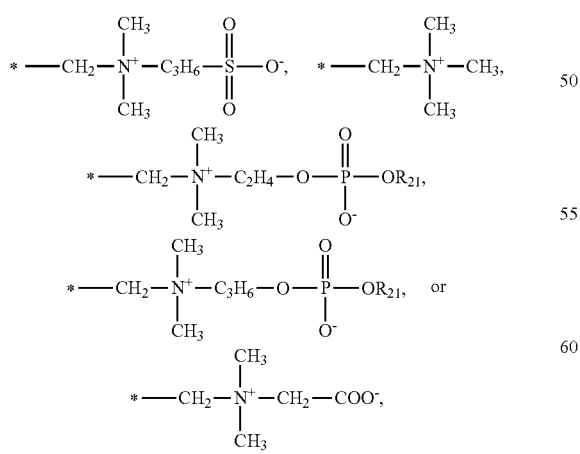

provided that at least one of $R_{11}$ and $R_{12}$ is the first hydrophilic group;

n1 is an integer of 2 to 20 (preferably 3 to 15, more preferably 4 to 10);
$R_{13}$ is H, *—COOH, *—CONH—$C_2H_4$—$(OC_2H_4)_{n1}$—$OCH_3$, or *—CONH—$C_2H_4$—$(OC_2H_4)_{n1}$—OH;
one of $R_{14}$ and $R_{15}$ is H or a second hydrophilic group which is *—$CH_2$—$(OC_2H_4)_{n1}$—$OCH_3$, *—$CH_2$—$(OC_2H_4)_{n1}$—OH,

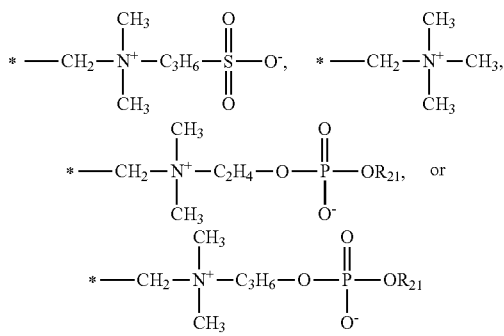

while the other of $R_{14}$ and $R_{15}$ is

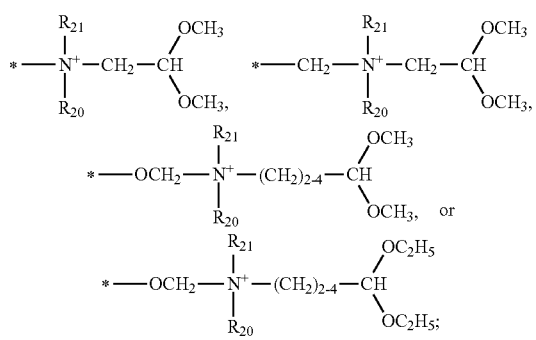

$R_{16}$ independent of each other are H, $CH_3$, $CCl_3$, $CF_3$, Cl, Br, $NR_1'R_1"$ in which $R_1'$ and
$R_1"$ independent of each other are H or $C_1$-$C_4$ alkyl, OH, $OCH_3$, $SO_3H$, or $SO_3^-Na^+$;
$R_{18}$ is $SO_3Na$,

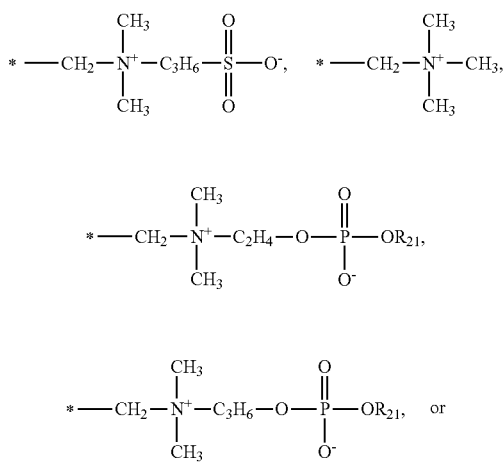

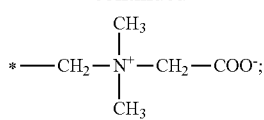

$R_{19}$ is H, SO₃Na,

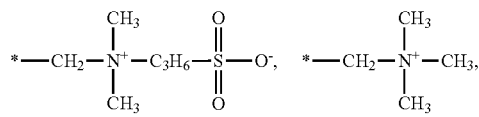

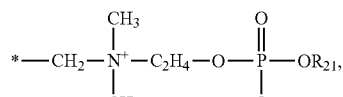

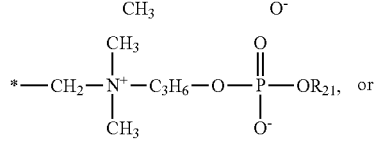

$R_{20}$ is CH₃, C₂H₅,

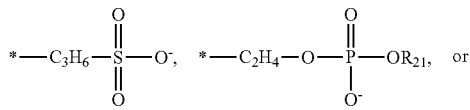

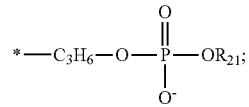

$R_{21}$ is methyl or ethyl;

L1 is a linkage of

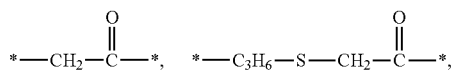

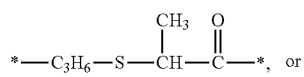

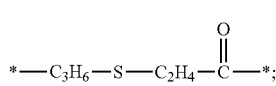

L2 is a linkage of *—CH₂—*, *—C₂H₄—*, *—C₃H₆—*, *—C₃H₆—S—C₂H₄—*, *—C₃H₆—S—C₃H₆—*, or

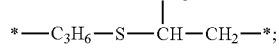

L3 is a linkage of *—CH₂—* or

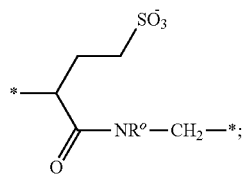

X1 is O or NR°.

Preferably, the lens-forming composition comprises a thiol-containing polyvinyl alcohol which comprises at least about 50% by mole of repeating units of vinyl alcohol of

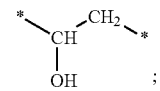

and repeating units of formula (1)

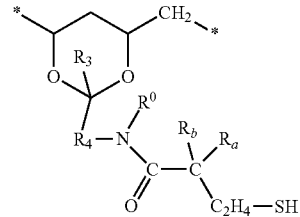

(1)

in which: R° and $R_3$ independent of each other are hydrogen or a $C_1$-$C_6$ alkyl group (preferably hydrogen or methyl, more preferably hydrogen), $R_4$ is a $C_2$-$C_6$ alkylene divalent radical (preferably a $C_3$-$C_4$ alkylene divalent radical, more preferably methylene or ethylene divalent radical, even more preferably propylene divalent radical), $R_a$ is hydrogen or methyl, and Rb is hydrogen, $C_1$-$C_3$ alkyl, acetyl, or $C_2$-$C_4$ alkanoylamino (e.g., acetylamino, propionylamino, butyrylamino) which optionally has a carboxyl group (preferably acetylamino, propionylamino or butyrylamino, more preferably acetylamino or propionylamino, even more preferably acetylamino).

Such thiol-containing polyvinyl alcohols can be prepared according to the procedures described U.S. Pat. Appl. Ser. No. 62/409,948.

In another preferred embodiment, a lens-forming composition comprises at least one silicone-containing prepolymer (any one of those described above), preferably at least one water-soluble silicone-containing prepolymer. Examples of water-soluble silicone-containing prepolymers include without limitation those disclosed in U.S. Pat. No. 9,187,601 (herein incorporated by reference in its entirety).

In any one of the preferred embodiments described above, the lens-forming composition comprises a UV-absorbing vinylic monomer in an amount to obtain a resultant contact lens (i.e., which is obtained from the curing of the lens formulation) having an UVB transmittance of about 10% or less (preferably about 5% or less, more preferably about 2.5% or less, even more preferably about 1% or less) between 280 and 315 nanometers and an UVA transmittance of about 30% or less (preferably about 20% or less, more preferably about 10% or less, even more preferably about 5% or less) between 315 and 380 nanometers.

Any suitable UV-absorbing vinylic monomers can be used in a lens-forming composition of the invention. Examples of preferred UV-absorbing vinylic monomers include without limitation: 2-(2-hydroxy-5-vinylphenyl)-2H-benzotriazole, 2-(2-hydroxy-5-acryloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropyl phenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl) benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5-[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9Cl) (CAS #83063-87-0); water-soluble UV-absorbing vinylic monomers disclosed in U.S. Pat. Appl. Ser. No. 15/434,105 (herein incorporated by reference in its entirety). In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

A "water-based lens-forming composition" refers to a polymerizable composition which comprises water as solvent or a solvent mixture comprising at least about 60% (preferably at least about 80%, more preferably at least about 90%, even more preferably at least about 95%, most preferably at least about 98%) by weight of water relative to the total amount of the solvent mixture and polymerizable/crosslinkable components, and which can be cured (i.e., polymerized and/or crosslinked) thermally or actinically to obtain a crosslinked/polymerized polymeric material.

Where the lens-forming composition is a water-based lens-forming composition, it preferably comprises a UV-absorbing vinylic monomer of any one of formula (VIII) to (XIV)

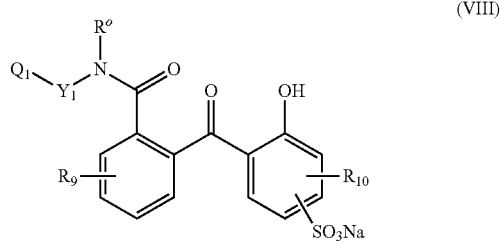

(VIII)

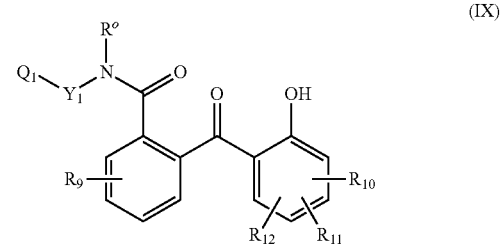

(IX)

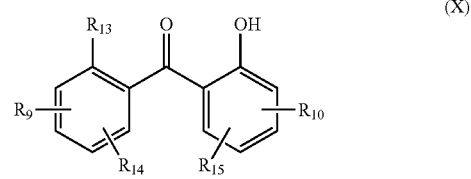

(X)

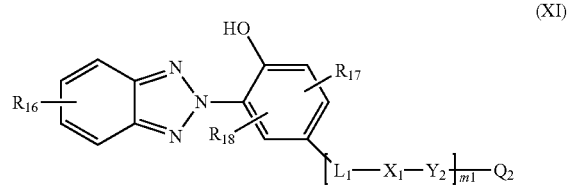

(XI)

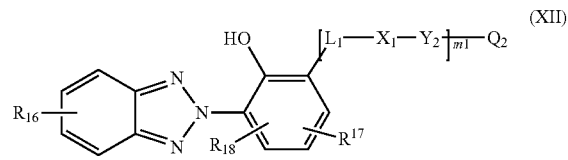

(XII)

-continued

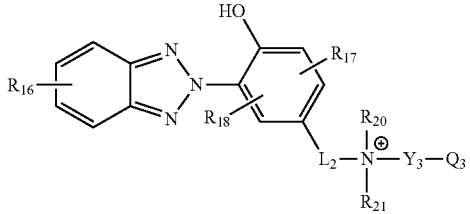
(XIII)

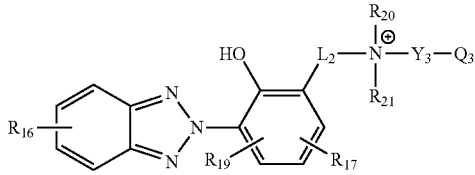
(XIV)

in which:
R° is H, CH$_3$ or C$_2$H$_5$;
R° is H, CH$_3$ or C$_2$H$_5$;
R$_9$, R$_{10}$ and R$_{17}$ independent of one other are H, CH$_3$, CCl$_3$, CF$_3$, Cl, Br, NR'R" in which
R' and R" independent of each other are H or C$_1$-C$_4$ alkyl, OH, or OCH$_3$;
R$_{11}$ and R$_{12}$ independent of each other are H or a first hydrophilic group which is *—CH$_2$—(OC$_2$H$_4$)$_{n1}$—OCH$_3$, *—CH$_2$—(OC$_2$H$_4$)$_{n1}$—OH,

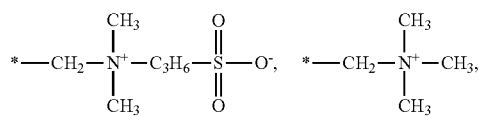

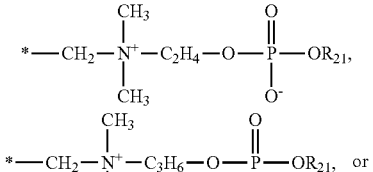

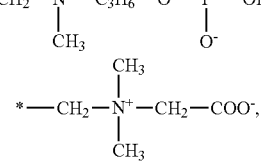

provided that at least one of R$_{11}$ and R$_{12}$ is the first hydrophilic group;
R$_{13}$ is H, *—COOH, *—CONH—C$_2$H$_4$—(OC$_2$H$_4$)$_{n1}$—OCH$_3$, or *—CONH—C$_2$H$_4$—(OC$_2$H$_4$)$_{n1}$—OH;
one of R$_{14}$ and R$_{15}$ is H or a second hydrophilic group which is *—CH$_2$—(OC$_2$H$_4$)$_{n1}$—OCH$_3$, *—CH$_2$—(OC$_2$H$_4$)$_{n1}$—OH,

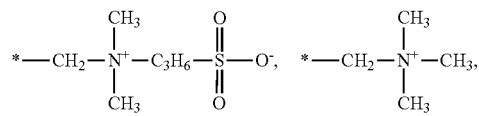

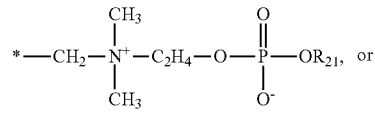

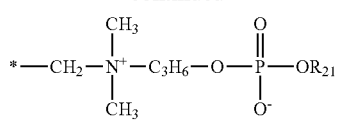

while the other of R$_{14}$ and R$_{15}$ is

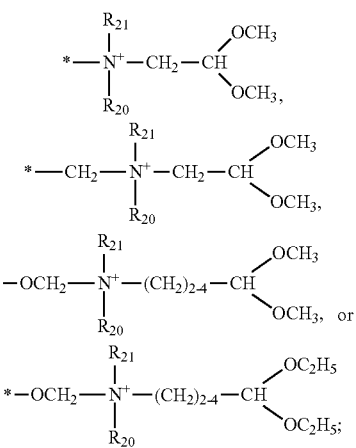

R$_{16}$ independent of each other are H, CH$_3$, CCl$_3$, CF$_3$, Cl, Br, NR$_1$'R$_1$" in which R$_1$' and R$_1$" independent of each other are H or C$_1$-C$_4$ alkyl, OH, OCH$_3$, SO$_3$H, or SO$_3^-$Na$^+$;
R$_{18}$ is SO$_3$Na,

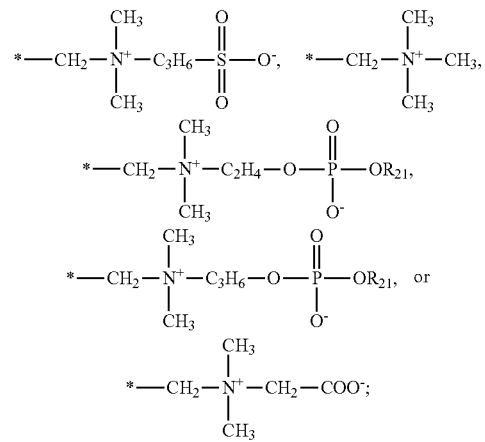

R$_{19}$ is H, SO$_3$Na,

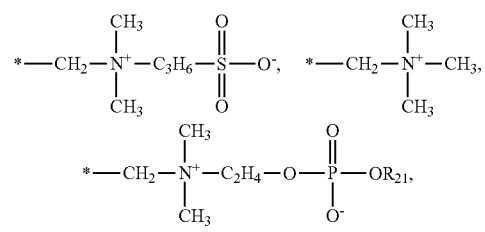

-continued

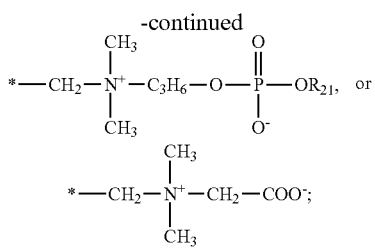

$R_{20}$ is $CH_3$, $C_2H_5$,

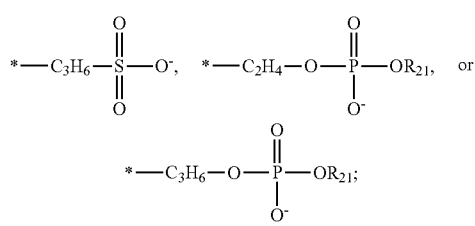

$R_{21}$ is methyl or ethyl;
L1 is a linkage of

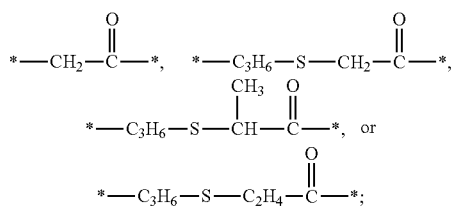

L2 is a linkage of *—$CH_2$—*, *—$C_2H_4$—*, *—$C_3H_6$—*, *—$C_3H_6$—S—$C_2H_4$—*, *—$C_3H_6$—S—$C_3H_6$—*, or

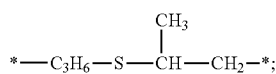

L3 is a linkage of *—$CH_2$—* or

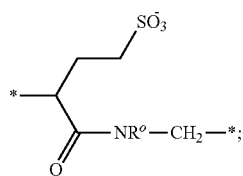

X1 is O or $NR^o$;
$Y_1$, $Y_2$, and $Y_3$ independent of one another are a $C_2$-$C_4$ alkylene divalent radical;
Q1, Q2, and Q3 independent of one another are a (meth)acryloylamido or (meth)acryloyloxy group;
m1 is zero or 1, provided that if m1 is zero, then $Q_2$ is a (meth)acryloylamido group; and
n1 is an integer of 2 to 20 (preferably 3 to 15, more preferably 4 to 10).

UV-absorbing vinylic monomers of any one of formula (VIII) to (XIV) can be prepared according to procedures described in U.S. patent application Ser. No. 15/434,105.

In accordance with the invention, a lens formulation can be a water-based lens formulation, an organic solvent-based lens formulation, or a solventless formulation.

A lens formulation can be prepared by dissolving all of the desirable components in water, a mixture of water and an organic solvent, an organic solvent, or a mixture of two or more organic solvent, or by blending all polymerizable components without any solvent, as known to a person skilled in the art.

Lens molds for making contact lenses are well known to a person skilled in the art. Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Bonebemer et al., which are also incorporated herein by reference. Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

Preferably, a reusable mold suitable for spatial limitation of radiation is used in the invention, the projected beam of radiation (e.g., radiation from the light source including the light in the region of 360 nm to 550 nm) limits radiation (e.g., UV radiation) impinging on the mixture of the lens-forming materials located in the path of the projected beam from the first molding surface to the second molding surface of the reusable mold. The resultant contact lens comprises an anterior surface defined by the first molding surface, an opposite posterior surface defined by the second molding surface, and a lens edge (with sharp edge and high quality) defined by the sectional profile of the projected radiation beam (i.e., a spatial limitation of radiation). Examples of reusable molds suitable for spatial limitation of radiation include without limitation those disclosed in U.S. Pat. Nos. 6,627,124, 6,800,225, 7,384,590, and 7,387,759, which are incorporated by reference in their entireties.

For example, a preferred reusable mold comprises a first mold half having a first molding surface and a second mold half having a second molding surface. The two mold halves of the preferred reusable mold are not touching each other, but there is a thin gap of annular design arranged between the two mold halves. The gap is connected to the mold cavity formed between the first and second molding surfaces, so that excess mixture can flow into the gap. It is understood that gaps with any design can be used in the invention.

In a preferred embodiment, at least one of the first and second molding surfaces is permeable to a crosslinking radiation. More preferably, one of the first and second molding surfaces is permeable to a crosslinking radiation while the other molding surface is poorly permeable to the crosslinking radiation.

The reusable mold preferably comprises a mask which is fixed, constructed or arranged in, at or on the mold half having the radiation-permeable molding surface. The mask is impermeable or at least of poor permeability compared with the permeability of the radiation-permeable molding surface. The mask extends inwardly right up to the mold surface and surrounds the mold cavity so as to screen all areas behind the mask with the exception of the mold cavity.

The mask may preferably be a thin chromium layer, which can be produced according to processes as known, for example, in photo and UV lithography. Other metals or metal oxides may also be suitable mask materials. The mask can also be coated with a protective layer, for example of silicon dioxide if the material used for the mold or mold half is quartz.

Alternatively, the mask can be a masking collar made of a material comprising a UV/visible light-absorber and substantially blocks curing energy therethrough as described in U.S. Pat. No. 7,387,759 (incorporated by reference in its entirety). In this preferred embodiment, the mold half with the mask comprises a generally circular disc-shaped transmissive portion and a masking collar having an inner diameter adapted to fit in close engagement with the transmissive portion, wherein said transmissive portion is made from an optically clear material and allows passage of curing energy therethrough, and wherein the masking collar is made from a material comprising a light-blocker and substantially blocks passage of curing energy therethrough, wherein the masking collar generally resembles a washer or a doughnut, with a center hole for receiving the transmissive portion, wherein the transmissive portion is pressed into the center opening of the masking collar and the masking collar is mounted within a bushing sleeve.

Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Deirin), Ultem® (polyetherimide) from G.E. Plastics, PrimoSpire®, etc. Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual molding surfaces, damage as a result of contact is ruled out. This ensures a high service life of the molds, which, in particular, also ensures high reproducibility of the contact lenses to be produced and high fidelity to the lens design.

In accordance with the invention, the lens-forming composition can be introduced (dispensed) into a cavity formed by a mold according to any known methods.

After the lens-forming composition is dispensed into the mold, it is polymerized to produce a contact lens. Crosslinking may be initiated thermally or upon exposure to a light source including a light in a region between 380 nm to 500 nm, preferably under a spatial limitation of actinic radiation, to crosslink the lens-forming material(s).

In accordance with the invention, light source can be any ones emitting light in the 380-500 nm range sufficient to activate visible light photoinitiators. Blue-light sources are commercially available and include: the Palatray CU bluelight unit (available from Heraeus Kulzer, Inc., Irvine, Calif.), the Fusion F450 blue light system (available from TEAMCO, Richardson, Tex.), Dymax Blue Wave 200, LED light sources from Opsytec (385 nm, 395 nm, 405 nm, 435 nm, 445 nm, 460 nm), LED light sources from Hamamatsu (385 nm), and the GE 24" blue fluorescent lamp (available from General Electric Company, U.S.). A preferred bluelight source is the UV LED from Opsytec (those described above).

The intensity of the light source is preferably from about 2 to about 40 $mW/cm^2$., preferably from about 4 to about 20 $mW/cm^2$ in the 380 nm to 460 nm region is more preferred. These intensity values are determined by weighting the lamp output using the photoinitiator master spectrum.

The photocrosslinking according to the invention may be effected in a very short time, e.g. ins about 15 seconds, preferably ins about 12.5 seconds, more preferably in ≤10 about seconds, even more preferably from about 3 to 9 seconds.

Opening of the mold so that the molded lens can be removed from the mold may take place in a manner known per se.

The molded contact lens can be subject to lens extraction to remove unpolymerized lens-forming material. The extraction solvent is preferably water or an aqueous solution. After extraction, lenses can be hydrated in water or an aqueous solution of a wetting agent (e.g., a hydrophilic polymer); packaged in lens packages with a packaging solution which can contain about 0.005% to about 5% by weight of a wetting agent (e.g., a hydrophilic polymer), a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof); sterilization such as autoclave at from 118 to 124° C. for at least about 30 minutes; and the like.

A contact lens of the invention preferably is characterized by having an UVB transmittance of about 10% or less (preferably about 5% or less, more preferably about 2.5% or less, even more preferably about 1% or less) between 280 and 315 nanometers and a UVA transmittance of about 30% or less (preferably about 20% or less, more preferably about 10% or less, even more preferably about 5% or less) between 315 and 380 nanometers and optionally (but preferably) a Violet transmittance of about 60% or less, preferably about 50% or less, more preferably about 40% or less, even more preferably about 30% or less) between 380 nm and 440 nm.

A contact lens of the invention further has a water content of preferably from about 15% to about 80%, more preferably from about 30% to about 70% by weight (at room temperature, about 22° C. to 28° C.) when fully hydrated.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A process for producing contact lenses, comprising the steps of:
   obtaining a lens-forming composition comprising at least one lens-forming material, at least one photoinitiator, and at least one thiol-containing compound or polymer in an amount for reducing the curing time of the lens-forming composition;

introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity for receiving the lens-forming composition is formed between said first and second molding surfaces; and irradiating, with a UV or visible light, the lens-forming composition in the mold for a time period of about 15 seconds or less, so as to crosslink and/or polymerize said at least one lens-forming material to form the contact lens.

2. The process of invention 1, wherein said at least one thiol-containing compound or polymer is present in an amount for reducing the curing time of the lens-forming composition by at least 20% compared to a control rming composition.

3. The process of invention 1, wherein said at least one thiol-containing compound or polymer is present in an amount for reducing the curing time of the lens-forming composition by at least 30% compared to a control composition.

4. The process of invention 1, wherein said at least one thiol-containing compound or polymer is present in an amount for reducing the curing time of the lens-forming composition by at least 40% compared to a control composition.

5. The process of invention 1, wherein said at least one thiol-containing compound or polymer is present in an amount for reducing the curing time of the lens-forming composition by at least 50% compared to a control composition.

6. The process of any one of inventions 1 to 5, wherein the lens-forming composition in the mold irradiating, with a UV or visible light, for a time period of about 12.5 seconds or less.

7. The process of any one of inventions 1 to 5, wherein the lens-forming composition in the mold irradiating, with a UV or visible light, for a time period of about 10 seconds or less.

8. The process of any one of inventions 1 to 5, wherein the lens-forming composition in the mold irradiating, with a UV or visible light, for a time period of from about 3 to about 9 seconds.

9. The process of any one of inventions 1 to 8, wherein the photoinitiator is a visible-light photoinitiator which can initiates free radical crosslinking and/or polymerizing reaction upon irradiation with a visible light having a wavelength greater than 380 nm and less than 500 nm and the step of irradiating is performed by using the visible light having a wavelength greater than 380 nm and less than 500 nm.

10. The process of any one of inventions 1 to 9, wherein the lens-forming material comprises at least one vinylic macromer or at least one prepolymer.

11. The process of invention 10, wherein the lens-forming material comprises at least one prepolymer.

12. The process of any one of inventions 1 to 11, wherein the lens-forming material comprises a water-soluble prepolymer.

13. The process of invention 12, wherein the water-soluble prepolymer is free of silicone.

14. The process of invention 13; wherein the water-soluble prepolymer is a crosslinkable polyvinyl alcohol prepolymer which repeating units of vinyl alcohol of

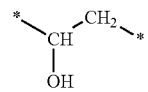

and repeating units of formula (I)

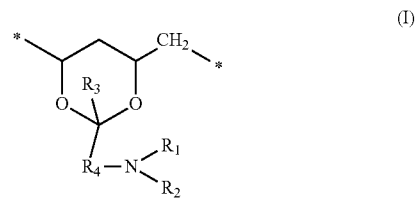

in which:
R$_1$ is hydrogen or C$_1$-C$_6$ alkyl;
R$_2$ is an ethylenically unsaturated group of

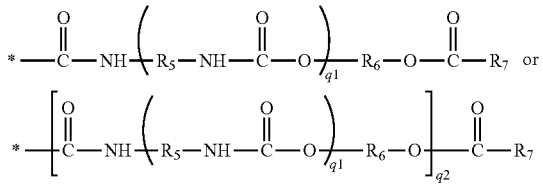

in which q1 and q2 independently of each another are zero or one, and R$_5$ and Re independently of each another are a C$_2$-C$_8$ alkylene divalent radical, R$_7$ is C$_2$-C$_8$ alkenyl;
R$_3$ can be hydrogen or a C$_1$-C$_6$ alkyl group; and
R$_4$ is a C$_1$-C$_6$ alkylene divalent radical.

15. The process of invention 13, wherein in formula (I) R$_1$ is hydrogen or C$_1$-C$_4$ alkyl.

16. The process of invention 13, wherein in formula (I) R$_1$ is hydrogen or methyl or ethyl.

17. The process of invention 13, wherein in formula (I) R$_1$ is hydrogen or methyl.

18. The process of any one of inventions 13 to 17, wherein in formula (I) R$_3$ is hydrogen).

19. The process of any one of inventions 13 to 18, wherein in formula (I) R$_4$ is a C$_1$-C$_4$ alkylene divalent radical.

20. The process of any one of inventions 13 to 19, wherein in formula (I) R$_4$ is a methylene or butylene divalent radical.

21. The process of any one of inventions 13 to 19, wherein in formula (I) R$_4$ is a methylene divalent radical.

22. The process of any one of inventions 13 to 21, wherein the crosslinkable polyvinyl alcohol prepolymer further comprises UV-absorbing repeating units, each of which preferably is a repeating unit of formula (II)

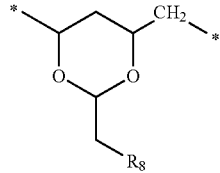

in which:

$R_8$ is a monovalent radical of any one of formula (III)-(VII)

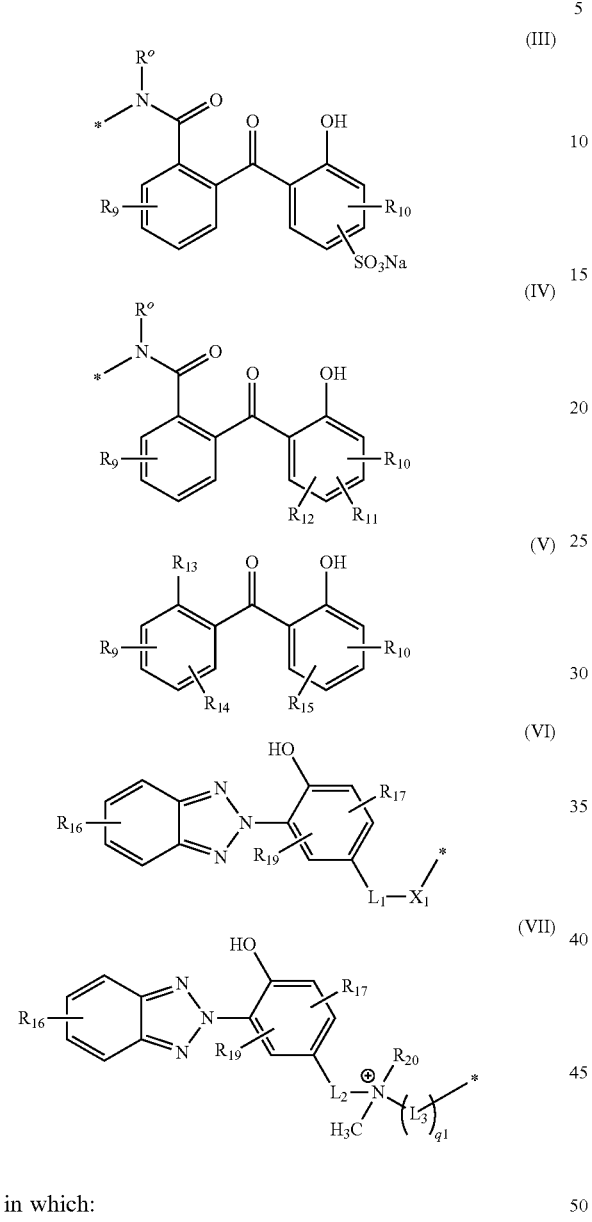

in which:
q1 is zero or 1-4;
$R^o$ is H, $CH_3$ or $C_2H_5$;
$R_9$, $R_{10}$ and $R_{17}$ independent of one other are H, $CH_3$, $CCl_3$, $CF_3$, Cl, Br, NR'R" in which R' and R" independent of each other are H or $C_1$-$C_4$ alkyl, OH, or $OCH_3$;
$R_{11}$ and $R_{12}$ independent of each other are H or a first hydrophilic group which is *—$CH_2$—$(OC_2H_4)_{n1}$—$OCH_3$, *—$CH_2$—$(OC_2H_4)_{n1}$—OH,

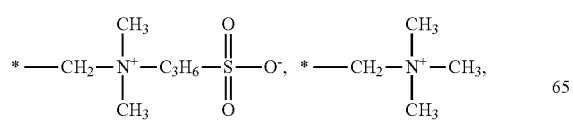

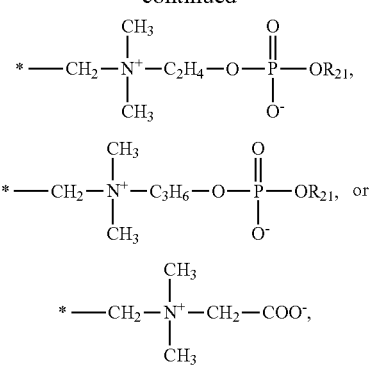

provided that at least one of $R_{11}$ and $R_{12}$ is the first hydrophilic group;

n1 is an integer of 2 to 20 (preferably 3 to 15, more preferably 4 to 10); $R_{13}$ is H, *—COOH, *—CONH—$C_2H_4$—$(OC_2H_4)_{n1}$—$OCH_3$, or *—CONH—$C_2H_4$—$(OC_2H_4)_{n1}$—OH;

one of $R_{14}$ and $R_{15}$ is H or a second hydrophilic group which is *—$CH_2$—$(OC_2H_4)_{n1}$—$OCH_3$, *—$CH_2$—$(OC_2H_4)_{n1}$—OH,

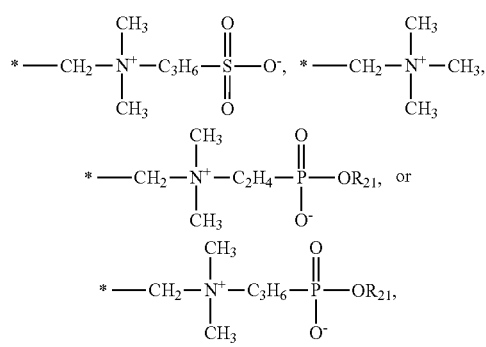

while the other of $R_{14}$ and $R_{15}$ is

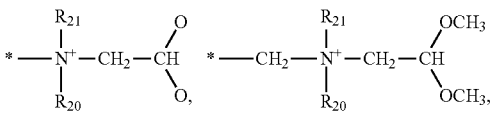

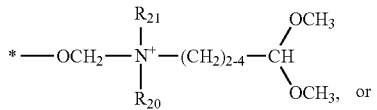

$R_{16}$ independent of each other are H, $CH_3$, $CCl_3$, $CF_3$, Cl, Br, $NR_1'R_1"$ in which $R_1'$ and $R_1"$ independent of each other are H or $C_1$-$C_4$ alkyl, OH, $OCH_3$, $SO_3H$, or $SO_3^-Na^+$;

$R_{18}$ is $SO_3Na$,

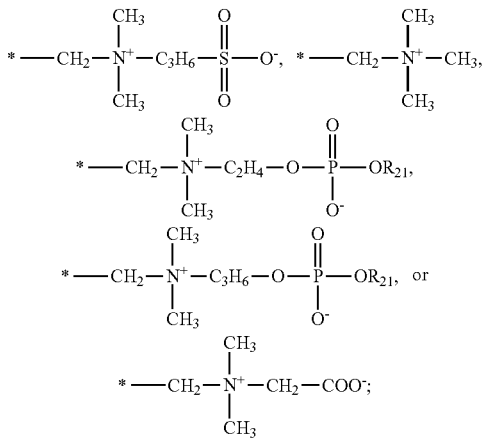

$R_{19}$ is H, $SO_3Na$,

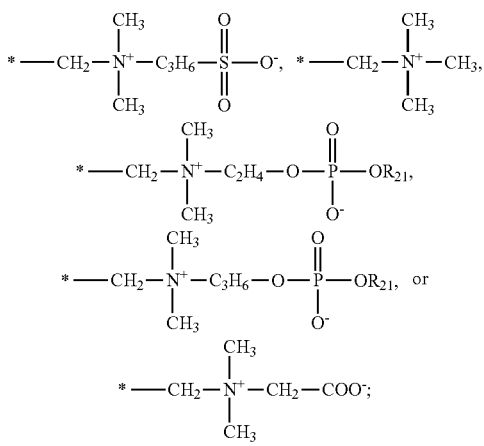

$R_{20}$ is $CH_3$, $C_2H_5$,

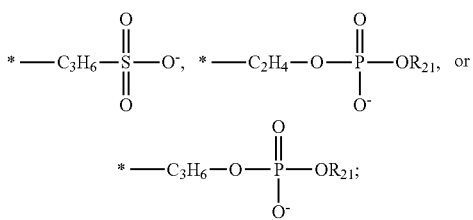

$R_{21}$ is methyl or ethyl;

L1 is a linkage of

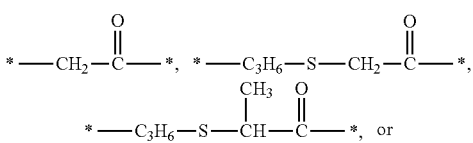

-continued

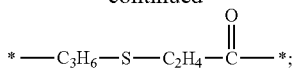

L2 is a linkage of *—$CH_2$—*, *—$C_2H_4$—*, *—$C_3H_6$—*, *—$C_3H_6$—S—$C_2H_4$—*, *—$C_3H_6$—S—$C_3H_6$—*, or

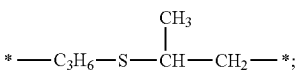

L3 is a linkage of *—$CH_2$—* or

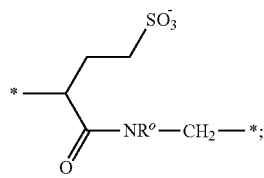

X1 is O or $NR^o$.

23. The process of any one of inventions 1 to 22, wherein the lens-forming composition comprises a thiol-containing polyvinyl alcohol which comprises at least about 50% by mole of repeating units of vinyl alcohol; and repeating units of formula (1)

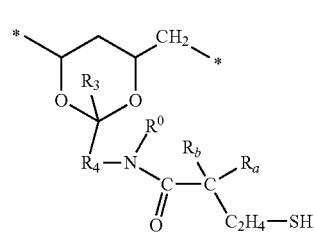

in which: $R^o$ and $R_3$ independent of each other are hydrogen or a $C_1$-$C_6$ alkyl group, $R_4$ is a $C_2$-$C_6$ alkylene divalent radical (preferably a $C_3$-$C_4$ alkylene divalent radical, more preferably a propylene or butylene divalent radical, even more preferably a propylene divalent radical), $R_a$ is hydrogen or methyl, and Rb is hydrogen, $C_1$-$C_3$ alkyl, acetyl, or $C_2$-$C_4$ alkanoylamino (e.g., acetylamino, propionylamino, butyrylamino) which optionally has a carboxyl group (preferably acetylamino, propionylamino or butyrylamino, more preferably acetylamino or propionylamino, even more preferably acetylamino).

24. The process of invention 23, wherein in formula (1) $R^o$ and $R_3$ independent of each other are hydrogen or methyl.

25. The process of invention 23, wherein in formula (1) $R^o$ and $R_3$ are hydrogen.

26. The process of any one of inventions 23 to 25, wherein in formula (1) $R_4$ is a $C_3$-$C_4$ alkylene divalent radical.

27. The process of any one of inventions 23 to 25, wherein in formula (1) $R_4$ is propylene or butylene divalent radical.

28. The process of any one of inventions 23 to 25, wherein in formula (1) $R_4$ is a propylene divalent radical.

29. The process of invention 11 or 12, wherein the prepolymer is a silicone-containing prepolymer.
30. The process of any one of inventions 1 to 29, wherein the lens-forming composition is a water-based lens-forming composition.
31. The process of any one of inventions 1 to 30, wherein the lens-forming composition comprises a UV-absorbing vinylic monomer in an amount to obtain the contact lens which has an UVB transmittance of about 10% or less (preferably about 5% or less, more preferably about 2.5% or less, even more preferably about 1% or less) between 280 and 315 nanometers and an UVA transmittance of about 30% or less (preferably about 20% or less, more preferably about 10% or less, even more preferably about 5% or less) between 315 and 380 nanometers.
32. The process of invention 31, wherein the lens-forming composition comprises a UV-absorbing vinylic monomer in an amount to obtain the contact lens which has an UVB transmittance of about 5% or less between 280 and 315 nanometers.
33. The process of invention 31, wherein the lens-forming composition comprises a UV-absorbing vinylic monomer in an amount to obtain the contact lens which has an UVB transmittance of about 2.5% or less between 280 and 315 nanometers.
34. The process of invention 31, wherein the lens-forming composition comprises a UV-absorbing vinylic monomer in an amount to obtain the contact lens which has an UVB transmittance of about 1% or less between 280 and 315 nanometers.
35. The process of any one of inventions 31 to 34, wherein the lens-forming composition comprises a UV-absorbing vinylic monomer in an amount to obtain the contact lens which has an UVA transmittance of about 20% or less between 315 and 380 nanometers.
36. The process of any one of inventions 31 to 34, wherein the lens-forming composition comprises a UV-absorbing vinylic monomer in an amount to obtain the contact lens which has an UVA transmittance of about 10% or less between 315 and 380 nanometers.
37. The process of any one of inventions 31 to 34, wherein the lens-forming composition comprises a UV-absorbing vinylic monomer in an amount to obtain the contact lens which has an UVA transmittance of about 5% or less between 315 and 380 nanometers.
38. The process of any one of inventions 1 to 37, wherein the mold is a reusable mold.
39. The process of invention 38, wherein the step of irradiating is performed under a spatial limitation of radiation, wherein the mold is a reusable mold comprising a mask which is fixed, constructed or arranged in, at or on the mold half having the radiation-permeable molding surface, wherein the mask is radiation-impermeable or at least of poor radiation-permeability compared with the radiation-permeable molding surface, wherein the mask extends inwardly right up to the mold cavity and surrounds the mold cavity so as to screen all areas behind the mask with the exception of the mold cavity.
40. A contact lens produced according to a process of any one of inventions 1 to 39.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Transmittance.

Contact lenses are manually placed into a specially fabricated sample holder or the like which can maintain the shape of the lens as it would be when placing onto eye. This holder is then submerged into a 1 cm path-length quartz cell containing phosphate buffered saline (PBS, pH~7.0-7.4) as the reference. A UV/visible spectrophotometer, such as, Varian Cary 3E UV-Visible Spectrophotometer with a LabSphere DRA-CA-302 beam splitter or the like, can be used in this measurement. Percent transmission spectra are collected at a wavelength range of 250-800 nm with % T values collected at 0.5 nm intervals. This data is transposed onto an Excel spreadsheet and used to determine if the lenses conform to Class 1 UV absorbance. Transmittance is calculated using the following equations:

$$UVA\ \%\ T = \frac{\text{Average }\%\ T\text{ between 380-316 nm}}{\text{Luminescence }\%\ T} \times 100$$

$$UVB\ \%\ T = \frac{\text{Average }\%\ T\text{ between 280-315 nm}}{\text{Luminescence }\%\ T} \times 100$$

in which Luminescence % T is the average % transmission between 380 and 780.

Photo-Rheology:

The photo-rheology experiment measures the elastic (G') and viscous modulus (G") as a function of time during curing. The experiment is conducted by using an appropriate light source, optionally cutoff filters to select wavelengths of interest, and a rheometer. The light source is a LED of appropriate wavelength (i.e. 385, 405, 435, 445, or 460 nm), or Mercury bulb in a Hamamatsu light source. The intensity of light source is set by adjusting either the light source output or the shutter opening to get an appropriate intensity measured by a radiometer. The sample is placed between a quartz plate that allows UV light to pass through and the rheometer. The cure time is determined when the shear modulus (G') reaches a plateau.

Example 2

An aqueous solution of a polyvinyl alcohol prepolymer of formula (I) is prepared according to the procedures described in Example 3 of WO2002071106 (herein incorporated by reference in its entirety). Darocure 1173 and lithium phenyl(2,4,6-trimethylbenzoyl) phosphinate (LiTPO), and L-cysteine methyl ester hydrochloride (as chain transfer agent, CTA) are added into the prepared aqueous solution to obtain water-based lens-forming corn positions having the concentrations of photoinitiator and chain transfer agent specified in Table 1. The photo-rheology studies of the obtained lens forming compositions are carried out according to the procedures described in Example 1 and the results are reported in Table 1.

TABLE 1

| | Lens-forming Composition | | | |
|---|---|---|---|---|
| | Comparative A (Control) | B | C | D |
| photoinitiator | Darocur 1173 (0.1 wt. %) | 1 wt. % LiTPO | | |
| CTA (wt. %) | 0 | 0 | 0.11 | 0.23 | 0.45 |
| Light Source | Hamamatsu | 405 nm LED | | |
| G' (kPa) | 345 | 340 | 300 | 285 | 232 |
| Curing Time (s) | 9 | 20 | 15.5 | 14.5 | 9.5 |
| $\Delta T_{curing}$ | — | — | 22.5% | 27.5% | 52.5% |

The results in Table 1 show that both the curing time and the shear modulus (G') can be reduced significantly by a chain transfer agent. The reduction in the shear modulus (G') will result in a lower elastic modulus of lenses cast-molded from the lens-forming composition.

The invention claimed is:

1. A process for producing contact lenses, comprising the steps of:
    (A) obtaining a lens-forming composition comprising at least one lens-forming material, at least one photoinitiator, and at least one thiol-containing polymer in an amount for reducing the curing time of the lens-forming composition by at least 20%, compared to a control composition,
    wherein the lens-forming material comprises a water-soluble prepolymer which is a crosslinkable polyvinyl alcohol prepolymer comprising repeating units of vinyl alcohol of

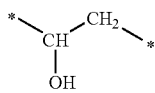

repeating units of formula (I), and

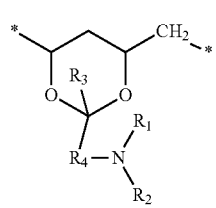

in which:
    $R_1$ is hydrogen or $C_1$-$C_6$ alkyl,
    $R_2$ is an ethylenically unsaturated group of

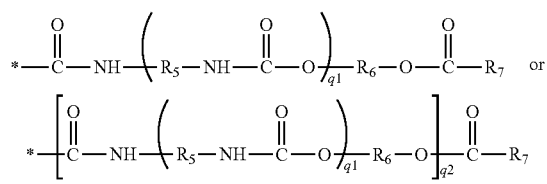

in which q1 and q2 independently of each another are zero or one, and $R_5$ and $R_6$ independently of each another are a $C_2$-$C_8$ alkylene divalent radical, $R_7$ is $C_2$-$C_8$ alkenyl, $R_3$ can be hydrogen or a $C_1$-$C_6$ alkyl group, and
$R_4$ is a $C_1$-$C_6$ alkylene divalent radical,
wherein the lens-forming composition comprises a thiol-containing polyvinyl alcohol which comprises at least about 50% by mole of repeating units of vinyl alcohol; and repeating units of formula (1)

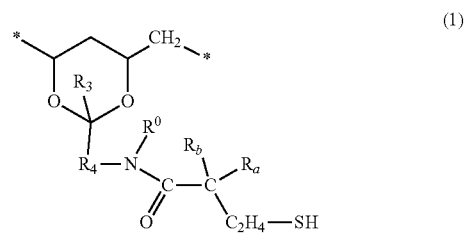

in which: $R^o$ and $R_3$ independent of each other are hydrogen or a $C_1$-$C_6$ alkyl group, $R_4$ is a $C_2$-$C_6$ alkylene divalent radical, $R_a$ is hydrogen or methyl, and Rb is hydrogen, $C_1$-$C_3$ alkyl, acetyl, or $C_2$-$C_4$ alkanoylamino which optionally has a carboxyl group;

(B) introducing the lens-forming composition into a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity for receiving the lens-forming composition is formed between said first and second molding surfaces; and (C) irradiating, with a UV or visible light, the lens-forming composition in the mold for a time period of about 15 seconds or less, so as to crosslink and/or polymerize said at least one lens-forming material to form the contact lens.

2. The process of claim 1, wherein the crosslinkable polyvinyl alcohol prepolymer further comprises UV-absorbing repeating units, each of which is a repeating unit of formula (II)

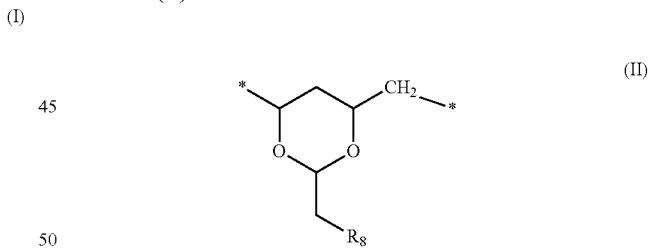

in which:
    $R_8$ is a monovalent radical of any one of formula (III)-(VII)

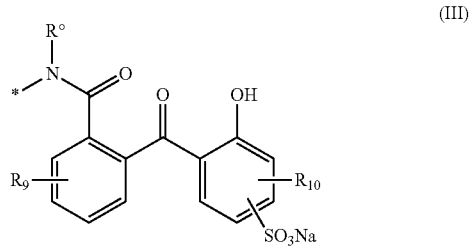

-continued

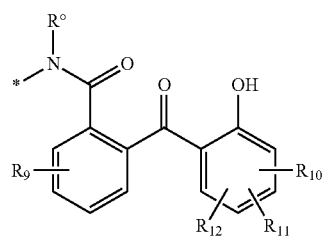
(IV)

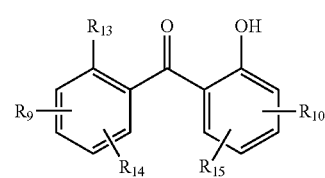
(V)

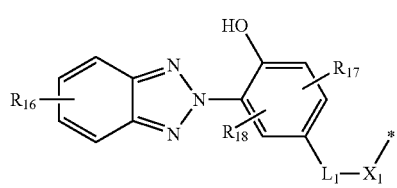
(VI)

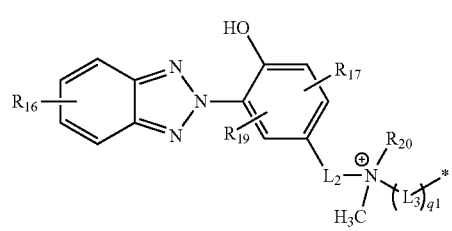
(VII)

in which:
q1 is zero or 1-4;
R° is H, CH$_3$ or C$_2$H$_5$;
R$_9$, R$_{10}$ and R$_{17}$ independent of one other are H, CH$_3$, CCl$_3$, CF$_3$, Cl, Br, NR'R" in which R' and R" independent of each other are H or C$_1$-C$_4$ alkyl, OH, or OCH$_3$;
R$_{11}$ and R$_{12}$ independent of each other are H or a first hydrophilic group which is *—CH$_2$—(OC$_2$H$_4$)$_{n1}$—OCH$_3$, *—CH$_2$—(OC$_2$H$_4$)$_{n1}$—OH,

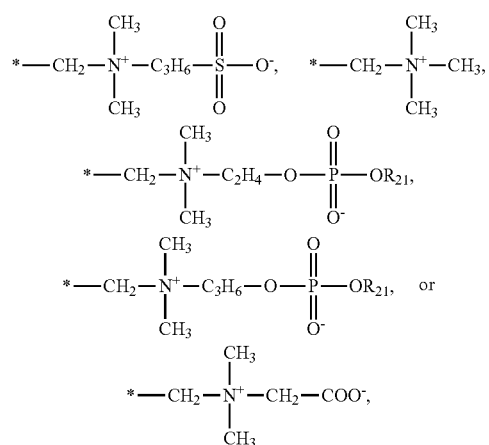

provided that at least one of R$_{11}$ and R$_{12}$ is the first hydrophilic group;

n1 is an integer of 2 to 20;
R$_{13}$ is H, *—COOH, *—CONH—C$_2$H$_4$—(OC$_2$H$_4$)$_{n1}$—OCH$_3$, or *—CONH—C$_2$H$_4$—(OC$_2$H$_4$)$_{n1}$—OH;
one of R$_{14}$ and R$_{15}$ is H or a second hydrophilic group which is *—CH$_2$—(OC$_2$H$_4$)$_{n1}$—OCH$_3$, *—CH$_2$—(OC$_2$H$_4$)$_{n1}$—OH,

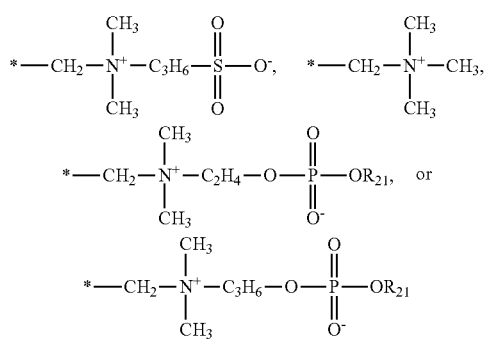

while the other of R$_{14}$ and R$_{15}$ is

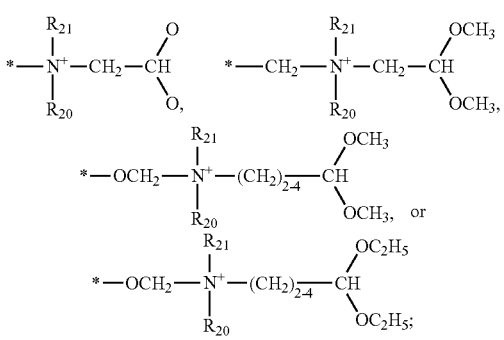

R$_{16}$ independent of each other are H, CH$_3$, CCl$_3$, CF$_3$, Cl, Br, NR$_1$'R$_1$" in which R$_1$' and R$_1$" independent of each other are H or C$_1$-C$_4$ alkyl, OH, OCH$_3$, SO$_3$H, or SO$_3^-$Na$^+$;
R$_{18}$ is SO$_3$Na,

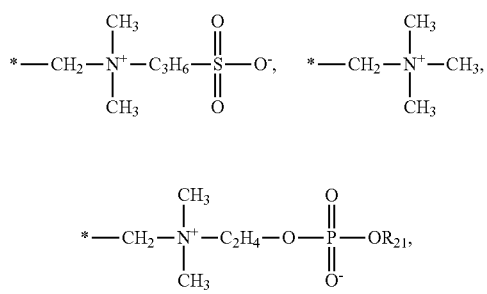

-continued

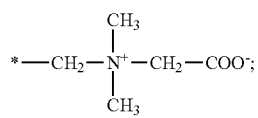

$R_{19}$ is H, $SO_3Na$,

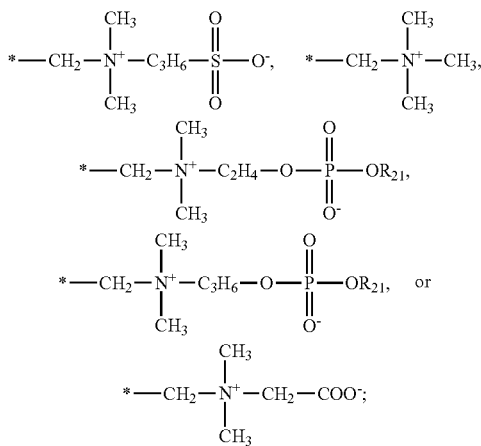

$R_{20}$ is $CH_3$, $C_2H_5$,

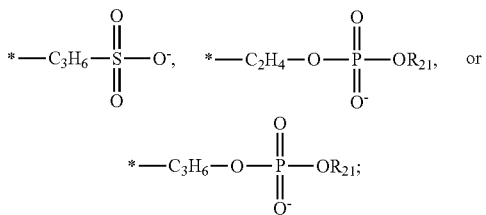

$R_{21}$ is methyl or ethyl;

L1 is a linkage of

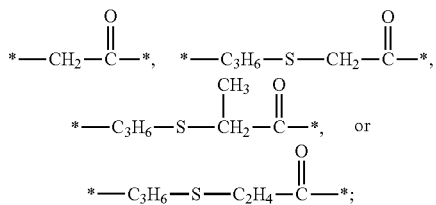

L2 is a linkage of *—$CH_2$—*, *—$C_2H_4$—*, *—$C_3H_6$—*, *—$C_3H_6$—S—$C_2H_4$—*, *—$C_3H_6$—S—$C_3H_6$—*, or

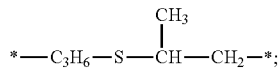

L3 is a linkage of *—$CH_2$—* or

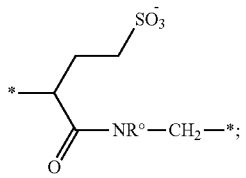

X1 is O or $NR^o$.

3. The process of claim 1, wherein the photoinitiator is a visible-light photoinitiator which initiates free radical cross-linking and/or polymerizing reaction upon irradiation with a visible light having a wavelength greater than 380 nm and less than 500 nm and the step of irradiating is performed by using the visible light having a wavelength greater than 380 nm and less than 500 nm.

4. The process of claim 1, wherein the lens-forming composition is a water-based lens-forming composition.

5. The process of claim 1, wherein the step of irradiating is performed under a spatial limitation of radiation, wherein the mold is a reusable mold comprising a mask which is fixed, constructed or arranged in, at or on the mold half having the radiation-permeable molding surface, wherein the mask is radiation-impermeable or at least of poor radiation-permeability compared with the radiation-permeable molding surface, wherein the mask extends inwardly right up to the mold cavity and surrounds the mold cavity so as to screen all areas behind the mask with the exception of the mold cavity.

6. The process of claim 2, wherein the step of irradiating is performed under a spatial limitation of radiation, wherein the mold is a reusable mold comprising a mask which is fixed, constructed or arranged in, at or on the mold half having the radiation-permeable molding surface, wherein the mask is radiation-impermeable or at least of poor radiation-permeability compared with the radiation-permeable molding surface, wherein the mask extends inwardly right up to the mold cavity and surrounds the mold cavity so as to screen all areas behind the mask with the exception of the mold cavity.

7. The process of claim 3, wherein the step of irradiating is performed under a spatial limitation of radiation, wherein the mold is a reusable mold comprising a mask which is fixed, constructed or arranged in, at or on the mold half having the radiation-permeable molding surface, wherein the mask is radiation-impermeable or at least of poor radiation-permeability compared with the radiation-permeable molding surface, wherein the mask extends inwardly right up to the mold cavity and surrounds the mold cavity so as to screen all areas behind the mask with the exception of the mold cavity.

* * * * *